United States Patent
Oh et al.

(10) Patent No.: US 11,836,082 B2
(45) Date of Patent: Dec. 5, 2023

(54) NEURAL PROCESSING DEVICE AND LOAD/STORE METHOD OF NEURAL PROCESSING DEVICE

(71) Applicant: Rebellions Inc., Seongnam-si (KR)

(72) Inventors: Jinwook Oh, Seongnam-si (KR);
Jinseok Kim, Seongnam-si (KR);
Donghan Kim, Seongnam-si (KR);
Kyeongryeol Bong, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 17/938,024

(22) Filed: Oct. 4, 2022

(65) Prior Publication Data

US 2023/0140309 A1    May 4, 2023

(30) Foreign Application Priority Data

Nov. 2, 2021   (KR) .......................... 10-2021-0149224

(51) Int. Cl.
*G06F 12/0875*   (2016.01)
*G06F 9/30*   (2018.01)
*G06N 3/04*   (2023.01)
*G06F 9/38*   (2018.01)
*G06F 15/80*   (2006.01)

(52) U.S. Cl.
CPC ...... *G06F 12/0875* (2013.01); *G06F 9/30043* (2013.01); *G06F 9/30047* (2013.01); *G06F 9/383* (2013.01); *G06F 15/8023* (2013.01); *G06N 3/04* (2013.01); *G06F 2212/1016* (2013.01)

(58) Field of Classification Search
CPC .. G06F 9/30034; G06F 12/0875; G06N 3/063
See application file for complete search history.

(56) References Cited

U.S. PATENT DOCUMENTS

| | | | | |
|---|---|---|---|---|
| 2018/0315399 A1* | 11/2018 | Kaul | ................... | G06F 9/30014 |
| 2019/0266479 A1* | 8/2019 | Singh | ........................ | G06F 1/26 |
| 2020/0142748 A1* | 5/2020 | Liu | ........................ | G06N 3/048 |
| 2021/0319291 A1* | 10/2021 | Park | ........................ | G06N 3/063 |
| 2021/0334631 A1* | 10/2021 | Park | ........................ | G06N 3/048 |
| 2021/0390778 A1* | 12/2021 | Kim | ........................ | G06N 5/046 |
| 2022/0335272 A1* | 10/2022 | Elsen | ..................... | G06F 17/16 |

FOREIGN PATENT DOCUMENTS

KR      10-2258566 B1      6/2021

* cited by examiner

*Primary Examiner* — Michael J Metzger
(74) *Attorney, Agent, or Firm* — BROADVIEW IP LAW, PC

(57) ABSTRACT

A neural processing device is provided. The neural processing device comprises: a processing unit configured to receive an input activation and a weight and perform a two-dimensional matrix calculation with the input activation and the weight to generate an output activation, a first memory, and a load-store unit (LSU) configured to perform memory access operations between the first memory and a second memory. The memory access operations include a main memory access operation for a current processing operation that is performed by the processing unit, and a standby memory access operation for a standby processing operation that is performed by the processing unit after the current processing operation. A level of the first memory is equal to a level of the processing unit, and a level of the second memory is different from the level of the first memory.

20 Claims, 32 Drawing Sheets

NEURAL PROCESSING DEVICE AND LOAD/STORE METHOD OF NEURAL PROCESSING DEVICE

CROSS-REFERENCE TO RELATED APPLICATION

This application claims priority under 35 U.S.C § 119 to Korean Patent Application No. 10-2021-0149224 filed in the Korean Intellectual Property Office on Nov. 2, 2021, the entire contents of which are hereby incorporated by reference.

TECHNICAL FIELD

The disclosure relates to a neural processing device and a load/store method of the neural processing device. Specifically, the disclosure relates to, for example, but not limited to, a neural processing device for maximizing use thereof and a load/store method of the neural processing device.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology which realizes human learning ability, reasoning ability, perceptual ability, natural language implementation ability, etc., it is of utmost important to process a large amount of data quickly.

The central processing unit (CPU) or graphics processing unit (GPU) of off-the-shelf computers was used for deep-learning training and inference in early artificial intelligence, but had limitations on the tasks of deep-learning training and inference with high workloads, and thus, neural processing units (NPUs) that are structurally specialized for deep learning tasks have received a lot of attention.

Since a neural processing device includes a large number of multiplication devices therein, it is difficult to secure a sufficient bandwidth for fetching data and programs necessary for calculations of the multiplication devices.

Therefore, it may be a very good technique to improve performance of the neural processing device by loading programs and data necessary for the next task in advance in time series.

The description set forth in the background section should not be assumed to be prior art merely because it is set forth in the background section. The background section may describe aspects or embodiments of the present disclosure.

SUMMARY

Aspects of the disclosure provide a neural processing device capable of efficiently maximizing a bandwidth with an external interface.

Aspects of the disclosure provide a load/store method of a neural processing device capable of efficiently maximizing a bandwidth with an external interface.

According to some aspects, a neural processing device comprises: a processing unit configured to receive an input activation and a weight and perform a two-dimensional matrix calculation with the input activation and the weight to generate an output activation; a first memory; and a load/store unit (LSU) configured to perform memory access operations between the first memory and a second memory, wherein the memory access operations include a main memory access operation for a current processing operation that is performed by the processing unit, and a standby memory access operation for a standby processing operation that is performed by the processing unit after the current processing operation, wherein a level of the first memory is equal to a level of the processing unit, and a level of the second memory is different from the level of the first memory.

According to some aspects, the neural processing device further comprises: an activation buffer configured to provide the input activation to the processing unit, receive the output activation from the processing unit, and temporarily store the input activation and the output activation; and an activation LSU configured to transmit the input activation from the first memory to the activation buffer and transmit the output activation from the activation buffer to the first memory, wherein the first memory is configured to temporarily store program, the input activation and the weight used for calculation which is performed by the processing unit, transmit the stored program, input activation and weight to the processing unit, and temporarily store the output data received from the processing unit.

According to some aspects, the standby memory access operation is performed by using a bandwidth that is not used by the main memory access operation within a bandwidth of a global interconnection.

According to some aspects, the LSU comprises: a main LSU configured to perform the main memory access operation between the first memory and the second memory; and a hidden LSU configured to perform the standby memory access operation between the first memory and the second memory.

According to some aspects, the hidden LSU comprises: a hidden load unit configured to fetch a standby load instruction received from a task controller to issue the standby load instruction; a hidden store unit configured to fetch a standby store instruction received from the task controller to issue the standby store instruction; a hidden load buffer configured to sequentially receive a memory access request corresponding to the standby load instruction from the hidden load unit; a hidden store buffer configured to sequentially receive a memory access request corresponding to the standby store instruction from the hidden store unit; a hidden load engine configured to receive the memory access request corresponding to the standby load instruction from the hidden load buffer and load data from the second memory to the first memory; and a hidden store engine configured to receive the memory access request corresponding to the standby store instruction from the hidden store buffer and store data from the first memory to the second memory.

According to some aspects, the main LSU comprises: a load unit configured to fetch a main load instruction and to issue the main load instruction; a store unit configured to fetch a main store instruction and to issue the main store instruction; a load buffer configured to sequentially receive a memory access request corresponding to the main load instruction from the load unit; a store buffer configured to sequentially receive a memory access request corresponding to the main store instruction from the store unit; a load engine configured to receive the memory access request corresponding to the main load instruction from the load buffer and load data from the second memory to the first memory; and a store engine configured to receive the memory access request corresponding to the main store instruction from the store buffer and store data from the first memory to the second memory.

According to some aspects, data transmitted by the main LSU has a higher priority than data transmitted by the hidden LSU.

According to some aspects, the priority is tagged to data between the first memory and the second memory.

According to some aspects, the LSU further comprises a scheduler configured to transmit data between the first memory and the second memory in a round-robin manner.

According to some aspects, the first memory includes a plurality of local memory banks, the number of data units between the first memory and the second memory per unit clock cycle divided by the number of the plurality of the local memory banks is less than a reference ratio of the scheduler.

According to some aspects, the hidden LSU and the main LSU share at least a part of hardware with each other.

According to some aspects, the hidden LSU and the main LSU are implemented by different hardware.

According to some aspects, a neural processing device comprises: a plurality of neural cores; a second memory configured to be shared between the plurality of neural cores; a global interconnection configured to transmit data between the second memory and the plurality of neural cores, wherein each of the plurality of neural cores comprises: a first memory configured to temporarily store data; a load/store unit (LSU) configured to load data from the second memory to the first memory and store data from the first memory in the second memory, and a processing unit configured to perform a two-dimensional matrix calculation, wherein the global interconnection includes a control channel for transmitting the control signal and a data channel for transmitting the input data and the output data, the LSU performs a main memory access operation for a current processing operation currently performed by the processing unit, and a standby memory access operation for a standby processing operation to be performed by the processing unit after the current operation, and the standby memory access operation is performed by using a bandwidth that is not used by the main memory access operation within a bandwidth of the data channel.

According to some aspects, the neural processing device further comprises: a local interconnection configured to transmit data between the plurality of neural cores, wherein the LSU performs the standby memory access operation by using a bandwidth that is not used by the main memory access operation within a bandwidth of the local interconnection.

According to some aspects, the LSU comprises a main LSU configured to perform the main memory access operation, and a hidden LSU configured to perform the standby memory access operation, and the standby memory access operation has a lower priority than the main memory access operation.

According to some aspects, a memory access method of a neural processing device including a load/store unit (LSU) and a processing unit, comprises: loading, by the LSU, first data for a first work from a second memory to a first memory; executing the first work by using the first data; loading, by the LSU, a second data for a second work to be executed after the first work, when data for the first work is not loaded; and executing the second work by using the second data after executing the first work and loading the second data are completed, wherein a level of the first memory is equal to a level of the processing unit, and a level of the second memory is different from the level of the first memory.

According to some aspects, the loading of the second data comprises: fetching a standby load instruction for the second data; issuing the fetched standby load instruction; transmitting a memory access request corresponding to the issued standby load instruction to a hidden load buffer; transmitting, by the hidden load buffer, the memory access request to a load engine; receiving, by the load engine, the second data from the second memory through a data channel according to the memory access request; and transmitting the second data to the first memory.

According to some aspects, the loading of the first data comprises: fetching a load instruction for the first data; issuing the fetched load instruction; transmitting a memory access request corresponding to the issued load instruction to a load buffer; transmitting, by the load buffer, the memory access request to a load engine; receiving, by the load engine, the first data from the second memory through the data channel according to the memory access request; and transmitting the first data to the first memory.

According to some aspects, the first work is a matrix calculation operation of a first layer of a neural network, and the second work is a matrix calculation operation of a second layer of the neural network.

According to some aspects, the first data is a program instruction for the first layer and the second data is a program instruction for the second layer.

According to some aspects, the first data is input activation for the first layer and the second data is kernel data of the second layer.

Aspects of the disclosure are not limited to those mentioned above, and other objects and advantages of the disclosure that have not been mentioned can be understood by the following description, and will be more clearly understood by embodiments of the disclosure. In addition, it will be readily understood that the objects and advantages of the disclosure can be realized by the means and combinations thereof set forth in the claims.

According to a neural processing device and a load/store method of the neural processing device of the disclosure, data or a program for the next job may be loaded in advance by optimally utilizing a bandwidth of an interface connecting the neural processing device to an external device.

In addition, it is possible to prevent a current operation from being delayed by preventing a load/store operation of a program and data for the next job from delaying a load/store operation of a program and data for an operation currently being performed.

Furthermore, it is possible to greatly increase utilization efficiency of hardware by sharing a main LSU and a hidden LSU.

In addition to the foregoing, the specific effects of the disclosure will be described together while elucidating the specific details for carrying out the embodiments below.

DETAILED DESCRIPTION

Figure 1:
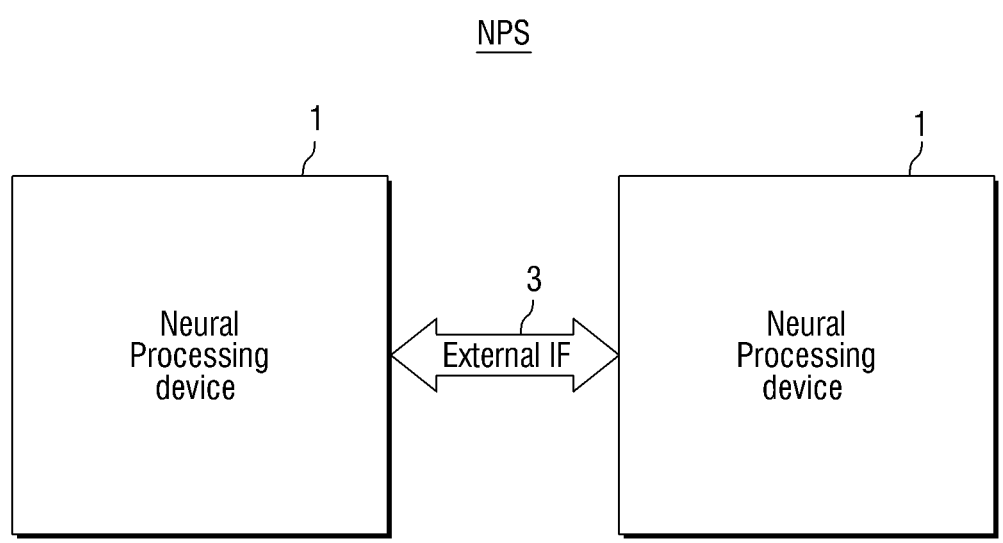
FIG. 1 is a block diagram for illustrating a neural processing system in accordance with an embodiment.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein.

When a part is said to include "at least one of a, b or c", this means that the part may include only a, only b, only c, both a and b, both a and c, both b and c, all of a, b and c, or variations thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing system in accordance with some embodiments will be described with reference to FIGS. 1 to 22.

FIG. 1 is a block diagram for illustrating a neural processing system in accordance with an embodiment.

Referring to FIG. 1, a neural processing system NPS in accordance with an embodiment may include one or more neural processing devices 1 and an external interface 3.

Each of the one or more neural processing devices 1 may be a device that performs calculations using an artificial neural network. Each of the one or more neural processing devices 1 may be, for example, a device specialized in performing the task of deep learning calculations. However, the embodiment is not limited thereto.

The one or more neural processing devices 1 may be connected to each other via the external interface 3 and share data and control signals.

Although FIG. 1 shows two neural processing devices, the neural processing system NPS in accordance with an embodiment is not limited thereto. That is, in a neural processing system NPS in accordance with an embodiment, three or more neural processing devices may be connected to each other via the external interface 3. Also, conversely, a neural processing system NPS in accordance with an embodiment may include only one neural processing device.

Hereinafter, the neural processing device 1 in accordance with an embodiment will be described with reference to FIG. 2.

Figure 2:
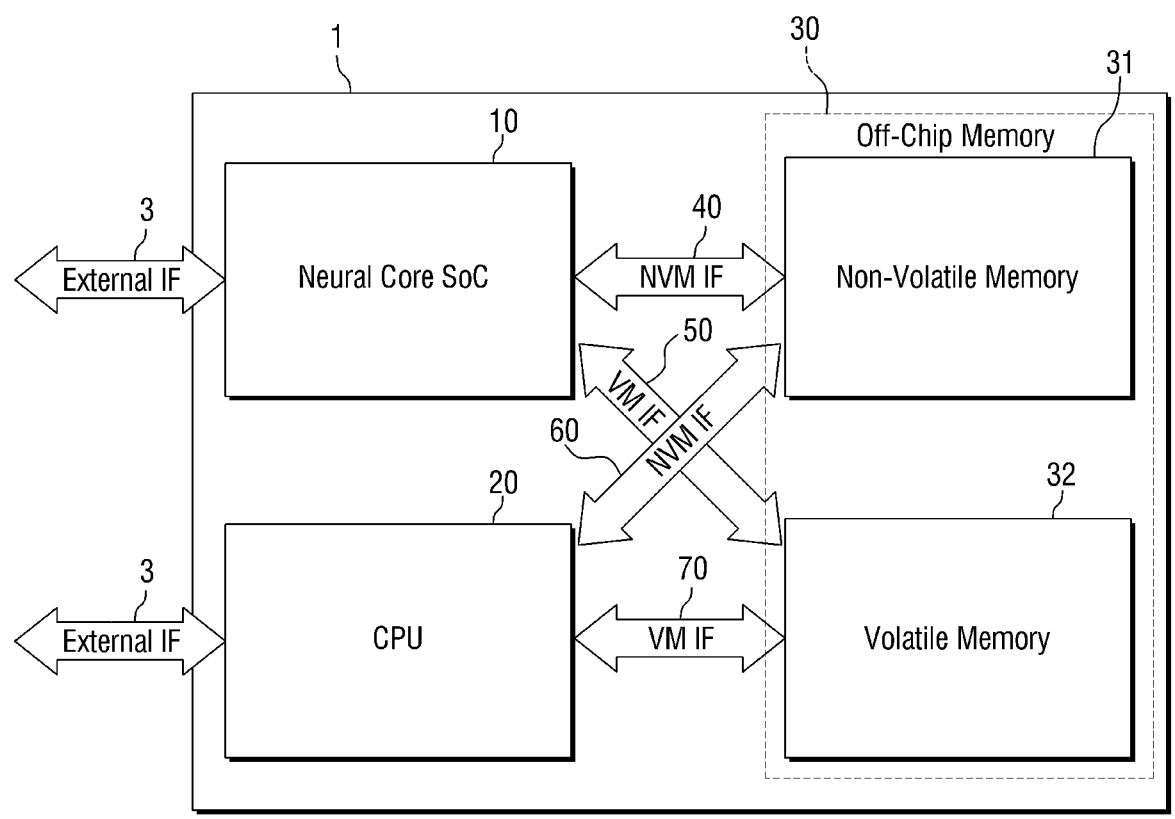
FIG. 2 is a block diagram for illustrating the neural processing device in accordance with an embodiment.

FIG. 2 is a block diagram for illustrating the neural processing device in accordance with an embodiment.

Referring to FIG. 2, the neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 is an artificial intelligence calculation device and may be an accelerator. The neural core SoC 10 may be, for example, any one of a graphics processing unit (GPU), a field-programmable gate array (FPGA), and an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are used a lot in deep learning. Accordingly, there can be high efficiency by performing calculations in deep learning inference and training tasks by the neural core SoC 10.

The CPU 20 may exchange data with other external calculation devices via the external interface 3. In addition, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Hereinafter, the neural core SoC 10 in accordance with an embodiment will be described with reference to FIG. 3.

Figure 3:
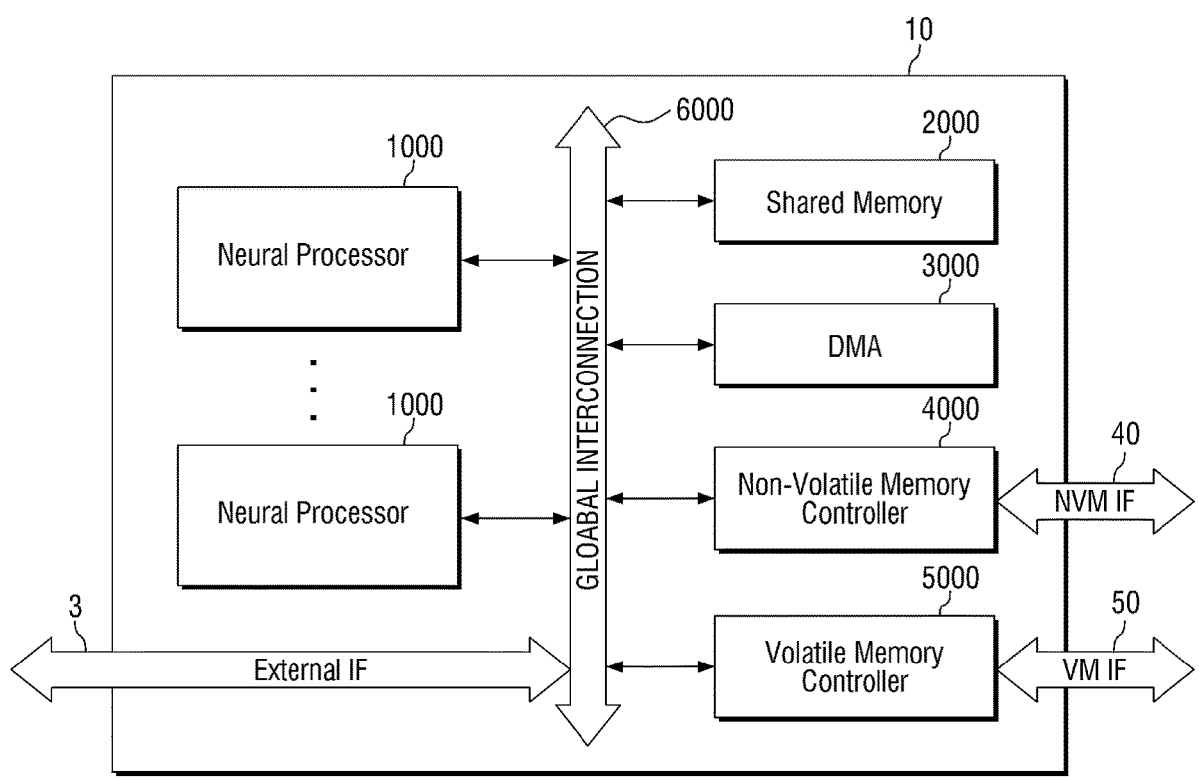
FIG. 3 is a block diagram for illustrating the neural core SoC in accordance with an embodiment.

FIG. 3 is a block diagram for illustrating the neural core SoC in accordance with an embodiment.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store them temporarily, and transfer them to each neural processor 1000. On the contrary, the shared memory 2000 may also receive data from the neural processor 1000, store them temporarily, and transfer them to the off-chip memory 30 of FIG. 2.

The shared memory 2000 may need a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Further, the volatile memory controller 5000 may perform a refresh task of the volatile memory 32. The volatile memory controller 5000 may control the non-volatile memory 31 via the first volatile memory interface 50.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device 1, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Therefore, the latency resulting from each request and instruction can greatly reduce the efficiency of tasks.

Accordingly, in the neural processing device 1, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may also increase significantly as the number of neural processors 1000 increases. Accordingly, in the neural processing device 1, the scheduling task is also performed by the individual neural processors 1000, and thus, the performance of the device can be improved without even a scheduling burden resulting therefrom.

Hereinafter, the global interconnection 6000 in accordance with an embodiment will be described with reference to FIG. 4.

Figure 4:
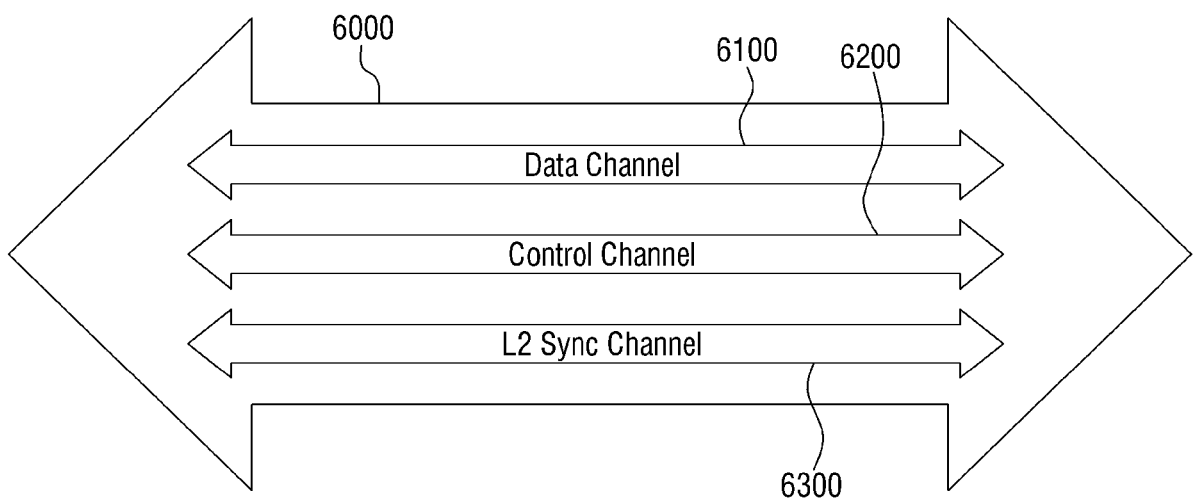
FIG. 4 is a structural diagram for illustrating the global interconnection in accordance with an embodiment.

FIG. 4 is a structural diagram for illustrating the global interconnection in accordance with an embodiment.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device 1 does not require new wiring work and may smoothly perform the synchronization task by using the global interconnection 6000.

Hereinafter, the neural processor 1000 in accordance with an embodiment will be described with reference to FIG. 5.

Figure 5:
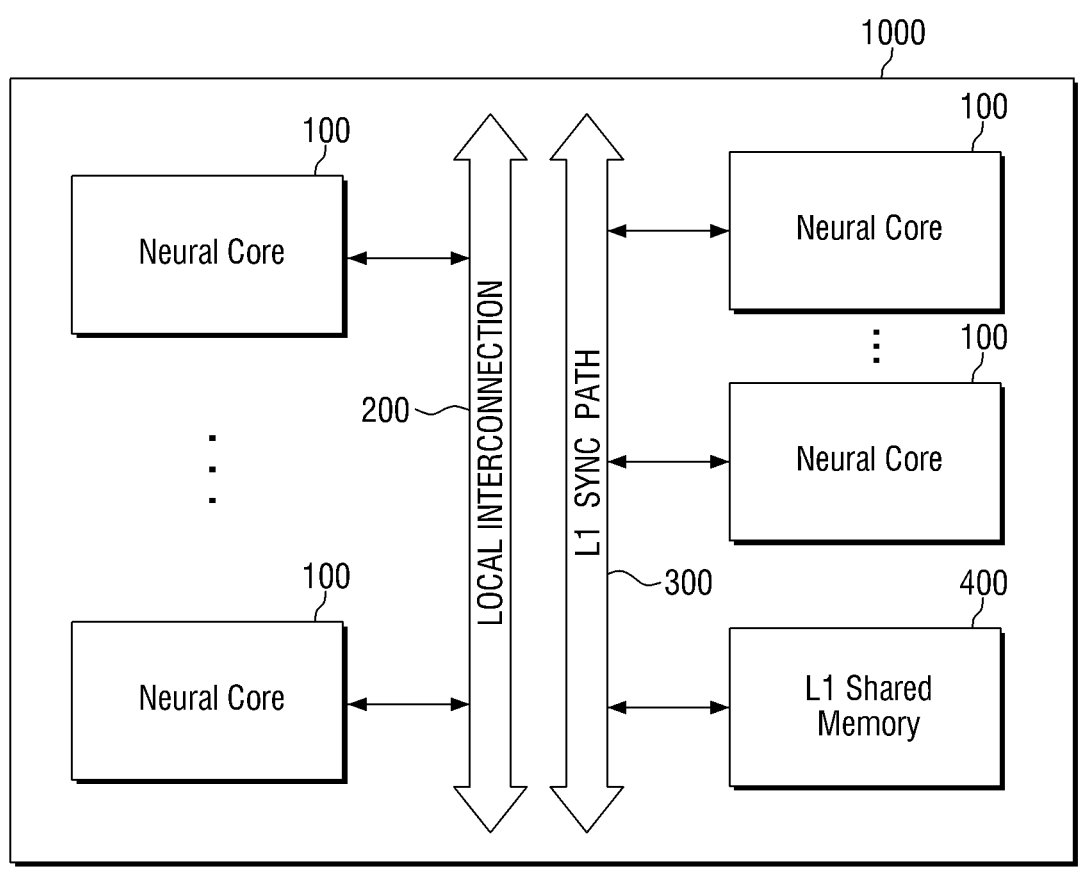
FIG. 5 is a block diagram for illustrating the neural processor in accordance with an embodiment.

FIG. 5 is a block diagram for illustrating the neural processor in accordance with an embodiment.

Referring to FIGS. 3 to 5, the neural processor 1000 may include at least one neural core 100, an L1 shared memory 400, a local interconnection 200, and an L1 sync path 300.

The at least one neural core 100 may share and perform the tasks of the neural processor 1000. The number of neural cores 100 may be, for example, eight. However, the embodiment is not limited thereto. FIGS. 3 and 5 illustrate that a plurality of neural cores are included in the neural processor 1000, but the embodiment is not limited thereto. That is, the neural processor 1000 may be configured with only one neural core.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, store them temporarily, and transfer them to each neural core 100. On the contrary, the L1 shared memory 400 may also receive data from the neural core 100, store them temporarily, and transfer them to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The local interconnection 200 may connect the at least one neural core 100 and the L1 shared memory 400 to each other. The local interconnection 200 may be a path through which data travels between the at least one neural core 100 and the L1 shared memory 400. The local interconnection 200 may be connected and transmit data to the global interconnection 6000 of FIG. 3.

The L1 sync path 300 may connect the at least one neural core 100 and the L1 shared memory 400 to each other. The L1 sync path 300 may be a path through which synchronization signals of the at least one neural core 100 and the L1 shared memory 400 travel.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000.

Hereinafter, the neural processing device 1 in accordance with an embodiment will be described with reference to FIG. 6.

Figure 6:
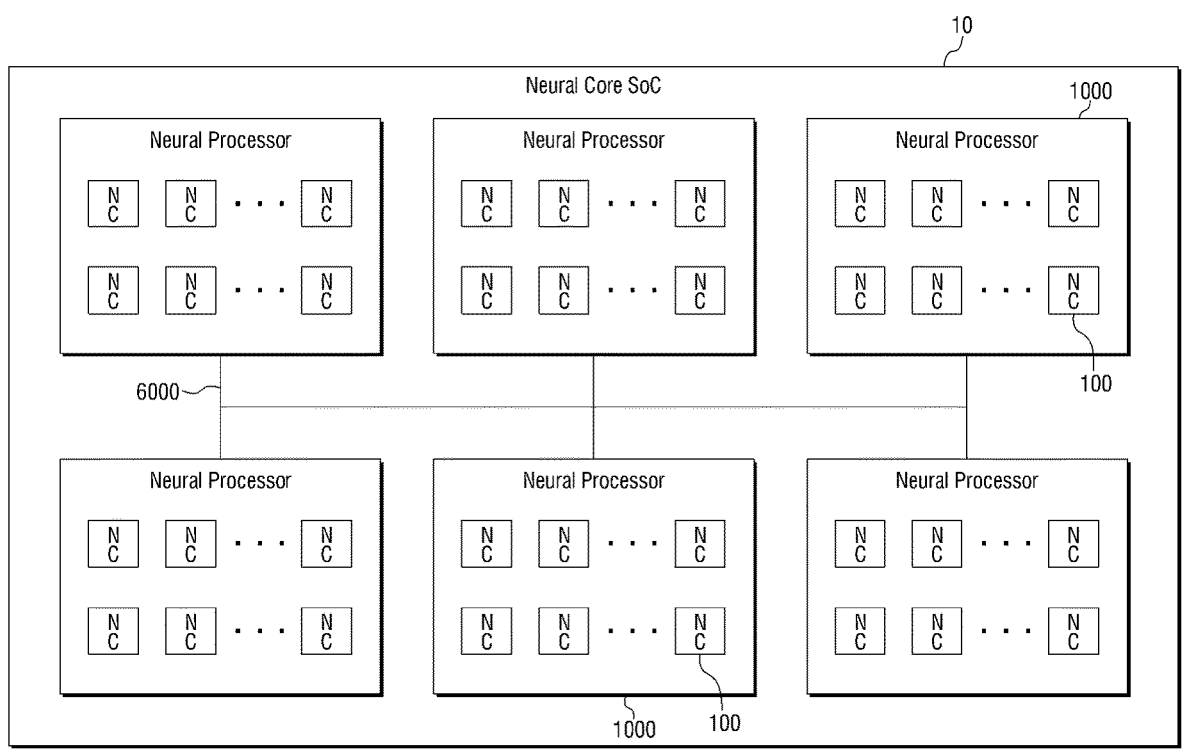
FIG. 6 is a diagram illustrating a hierarchical structure of a neural processing device in accordance with an embodiment.

FIG. 6 is a diagram illustrating a hierarchical structure of a neural processing device in accordance with an embodiment.

Referring to FIG. 6, the neural core SoC 10 may include one or more neural processors 1000. The one or more neural processors 1000 may transmit data to each other through a global interconnection 6000.

Each of the neural processors 1000 may include at least one neural core 100. The neural core 100 may be a processing unit optimized for a deep learning operation. The neural core 100 may be a processing unit corresponding to one operation of the deep learning operation. That is, the deep learning operation may be expressed as a sequential or parallel combination of several operations. The neural core 100 is a processing unit capable of processing one operation and may be a minimum calculation unit that may be considered for scheduling from the viewpoint of a compiler.

The neural processing device 1 may comprise the same scale of a minimum calculation unit and a hardware processing unit which are considered from the viewpoint of a compiler scheduling, thereby performing fast and efficient scheduling and a calculation.

That is, when the processing unit that may be divided in hardware is too large compared to a calculation, inefficiency of the calculation may occur in operation of the processing unit. In contrast to this, when a processing unit having a unit smaller than an operation is scheduled every time, inefficiency scheduling may occur, and hardware design cost may increase, and thus, the scheduling is not proper.

Therefore, according to the embodiment, by similarly adjusting a scale of a scheduling unit of a compiler and a scale of a hardware processing unit, scheduling of a fast calculation and an efficient calculation without wasting hardware resources may be performed.

Hereinafter, the neural core 100 in accordance with an embodiment will be described with reference to FIG. 7.

Figure 7:
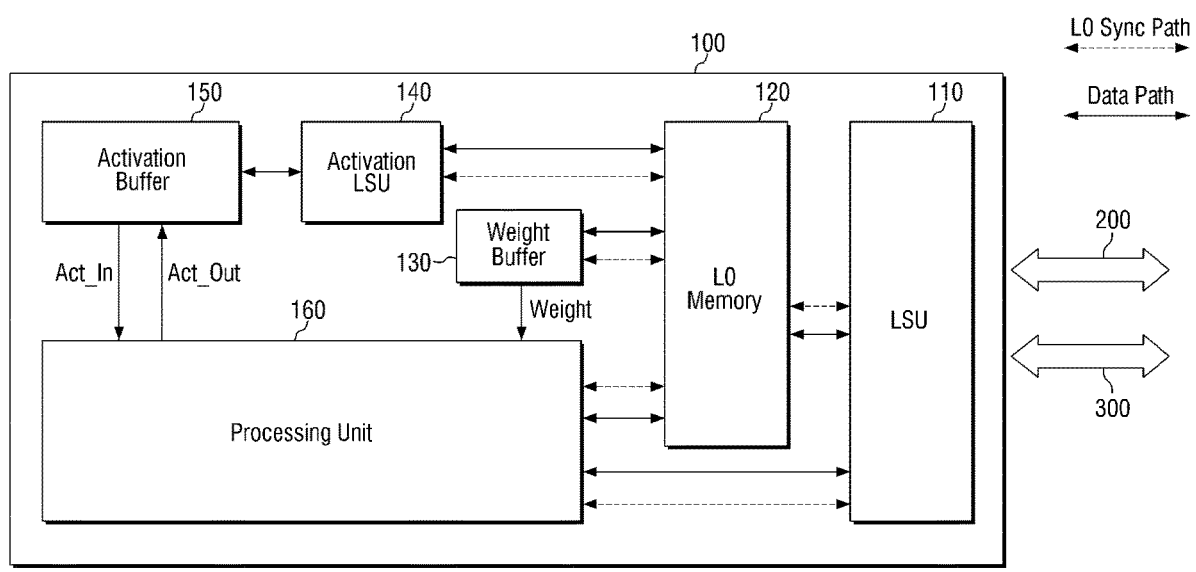
FIG. 7 is a block diagram for illustrating a neural core in accordance with an embodiment.

FIG. 7 is a block diagram for illustrating a neural core in accordance with an embodiment.

Referring to FIG. 7, a neural core 100 may include a load/store unit (LSU) 110, a L0 memory 120, a weight buffer 130, an activation LSU 140, an activation buffer 150 and a processing unit 160.

The LSU 110 may receive at least one of data, a control signal, or a synchronization signal from the outside through the local interconnection 200 and the L1 sync path 300. The LSU 110 may transmit at least one of the received data, the received control signal, or the received synchronization signal to the L0 memory 120. Similarly, the LSU 110 may transmit at least one of the data, the control signal, or the synchronization signal to the outside through the local interconnection 200 and the L1 sync path 300.

Hereinafter, the LSU 110 in accordance with an embodiment will be described with reference to the FIG. 7.

Figure 8:
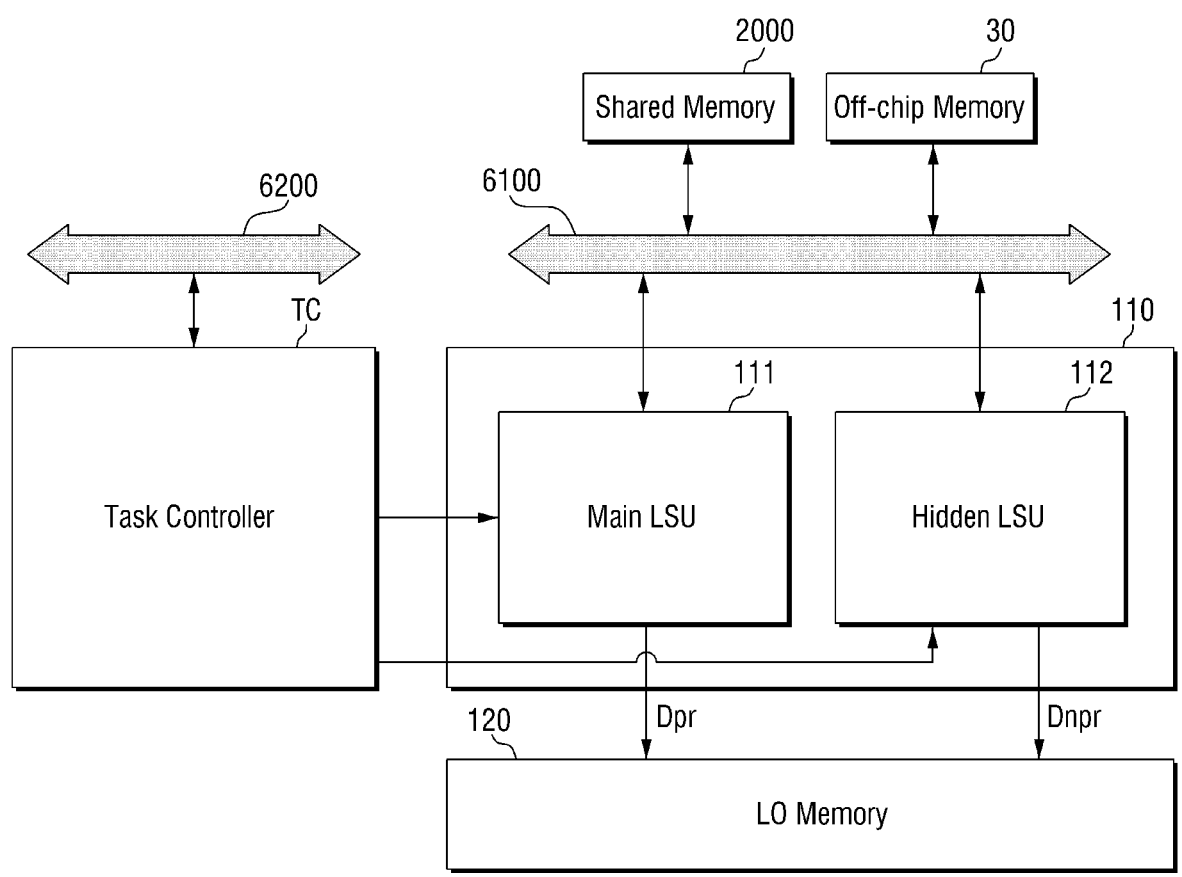
FIG. 8 is a block diagram illustrating an operation of an LSU.

FIG. 8 is a block diagram illustrating an operation of the LSU in accordance with an embodiment.

Referring to FIG. 8, a task controller TC may be a module that controls an operation of the neural core 100. The task controller TC may be implemented by the neural core 100. The task controller TC may be a module logically implemented by the neural core 100. However, the embodiment is not limited thereto.

A control channel 6200 may be a channel for transmitting a control signal, and a data channel 6100 may be a bus for transmitting input data and output data. The control channel 6200 may transmit a control signal for load or store for a current operation to the task controller TC. For example, the task controller TC may transmit at least one of a load instruction or a standby load instruction to the LSU 110. Alternatively, the task controller TC may transmit at least one of a store instruction or a standby store instruction to the LSU 110. The LSU 110 may perform a load/store operation according to at least one of the load instruction, the store instruction, the standby load instruction, or the standby store instruction.

In this case, the load instruction and the store instruction may indicate instructions for loading and storing data for a current processing operation currently being performed by the processing unit 160, and the standby load instruction and the standby store instruction may indicate instructions for loading and storing one or more program instructions, program or data for a next processing operation to be performed by the processing unit 160 after the current processing operation is completed. In some embodiments, the data for the processing operation includes at least one of one or more program instructions for the processing operation, program for the processing operation, or input data for the processing operation. In some embodiments, the input data for the processing operation includes at least one of input activation data or weights for a deep learning operation. In some embodiments, a plurality of processing operations may be required to be performed, e.g., for one neural network. The processing operation may be referred to as a program or a work in this disclosure. In some embodiments, a plurality of programs may be required to be performed for one neural network, each program of the plurality of programs including one or more program instructions. The number of programs may be, but not limited to, 136.

Each of the load instruction, the standby load instruction, the store instruction, and the standby store instruction may include the following details.

Dscrptr{src, dst, burst size, #burst}

In this case, src may indicate a source address of data to be loaded or stored, dst may indicate a destination address to which data is transmitted, burst size may indicate a size of a burst (e.g., a division size), and #burst may indicate a number of bursts (e.g., the number of divisions). However, the embodiment is not limited thereto.

The LSU 110 may include a main LSU 111 and a hidden LSU 112. The main LSU 111 may perform a main load/store operation during a load/store operation.

For example, the main LSU 111 may fetch a load instruction and issue the load instruction. Here, the issue of an instruction may indicate an operation for determining whether the instruction may be performed and for performing the instruction, if it is determined that the instruction can be performed.

The main LSU 111 may access an off-chip memory 30 through the data channel 6100 according to the issued load instruction to load data Dpr for the current processing operation and transmit the loaded data Dpr to the L0 memory 120. In this case, the loaded data Dpr may have a high priority. In some embodiments, the data Dpr may include one or more program instructions for the current processing operation, program for the current processing operation, or input data for the current processing operation.

The hidden LSU 112 may perform a standby load/store operation during the load/store operation. For example, the hidden LSU 112 may fetch a standby load instruction and issue the standby load instruction.

The hidden LSU 112 may access the off-chip memory 30 through the data channel 6100 according to the issued load instruction to load data Dnpr for the next processing operation and transmit the loaded data Dnpr to the L0 memory 120. In this case, the loaded data Dnpr may have a low priority. That is, the data Dpr may have a relatively higher priority than the data Dnpr. That is, the L0 memory 120 may load the data Dpr earlier than the data Dnpr. In some embodiments, the data Dnpr may include one or more program instructions for the next processing operation, program for the next processing operation, or input data for the next processing operation.

In this case, a priority may be identified in the form of tagging to data. Accordingly, the main load/store operation for the current processing operation currently being performed may not be delayed by a standby load/store operation. That is, the standby load/store operation may not interfere with the main load/store operation at all. Also, the standby load/store operation may be performed by using bandwidths other than the bandwidth of the data channel 6100 used for the main load/store operation. That is, a calculation may be performed after load operations of a program and data are performed in time series first, and time of the calculation may be much longer than time of the load operation.

Accordingly, the neural processing device 1 may maximize utilization of a bandwidth by allocating a bandwidth that is not utilized during a calculation to a standby operation.

Hereinafter, the LSU 110 in accordance with an embodiment will be described with reference to FIG. 9.

Figure 9:
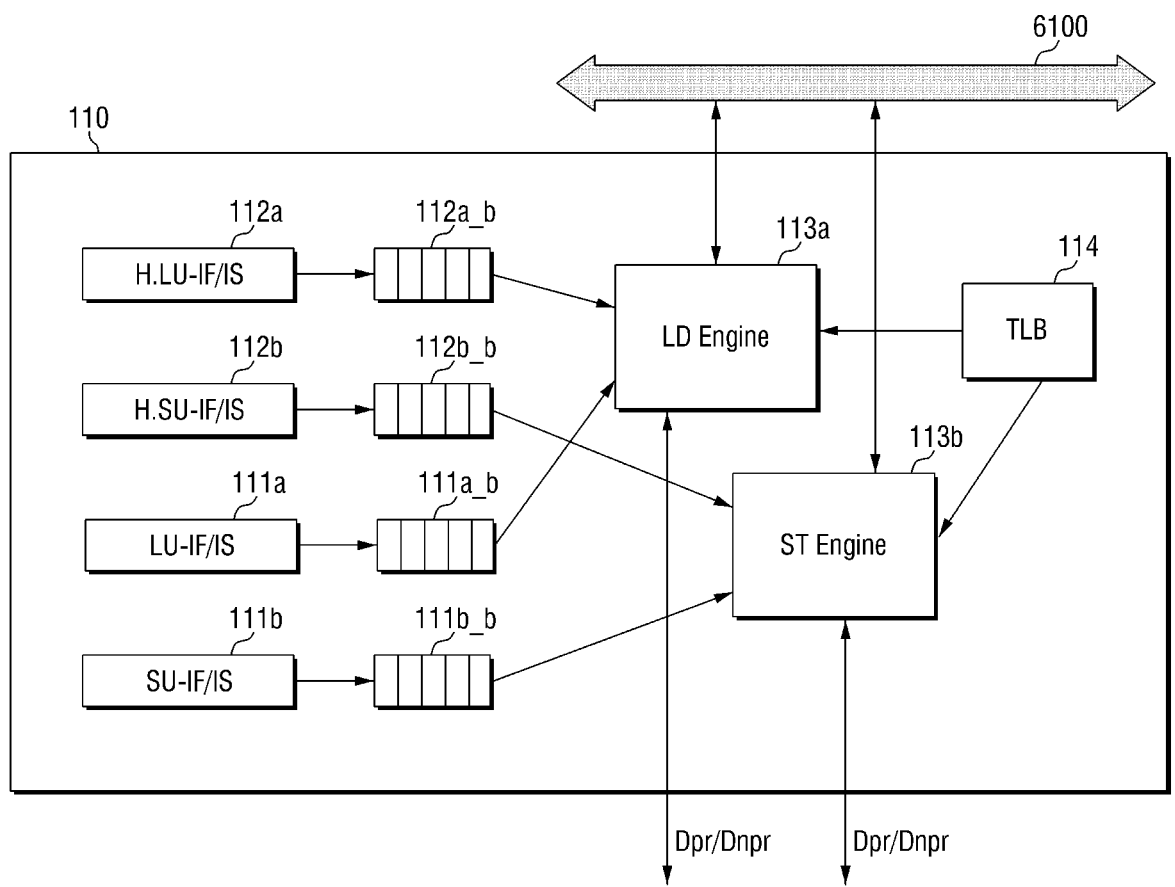
FIG. 9 is a block diagram for illustrating a structure of an LSU in accordance with an embodiment.

FIG. 9 is a block diagram for illustrating a structure of the LSU in accordance with an embodiment.

Referring to FIG. 9, the LSU 110 may include a load unit 111a, a store unit 111b, a load buffer 111a_b, a store buffer 111b_b, a hidden load unit 112a, a hidden load buffer 112a_b, a hidden store unit 112b, a hidden store buffer 112b_b, a load engine 113a, a store engine 113b, and a translation lookaside buffer (TLB) 114.

The load unit 111a may fetch a load instruction from the task controller TC and issue the load instruction. When the load unit 111a provides the issued load instruction to the load buffer 111a_b, the load buffer 111a_b may sequentially transmit a memory access request to the load engine 113a according to an input order of the memory access request.

Also, the store unit 111b may fetch a store instruction from the task controller TC and issue the store instruction. When the store unit 111b provides the issued store instruction to the store buffer 111b_b, the store buffer 111b_b may sequentially transmit a memory access request to the store engine 113b according to an input order of the memory access request.

The hidden load unit 112a may fetch a standby load instruction from the task controller TC and issue the standby load instruction. When the hidden load unit 112a provides the issued standby load instruction to the hidden load buffer 112a_b, the hidden load buffer 112a_b may sequentially transmit a memory access request to the load engine 113a according to an input order of the memory access request.

Also, the hidden store unit 112b may fetch a standby store instruction from the task controller TC and issue the standby store instruction. When the hidden store unit 112b provides the issued standby store instruction to the hidden store buffer 112b_b, the hidden store buffer 112b_b may sequentially transmit a memory access request to the store engine 113b according to an input order of the memory access request.

The load engine 113a may receive a memory access request to load data Dpr and data Dnpr through the data channel 6100. In this case, the load engine 113a may quickly find data in the translation lookaside buffer 114 by using a translation table of the recently used virtual address and physical address. When there is no virtual address of the load engine 113a in the translation lookaside buffer 114, address translation information may be found in the shared memory 2000.

The data Dpr may be data corresponding to the memory access request received from the load buffer 111a_b, and the data Dnpr may be data corresponding to the memory access request received from the hidden load buffer 112a_b.

In this case, the load buffer 111a_b and the hidden load buffer 112a_b may not simultaneously transmit memory access requests to the load engine 113a. That is, the hidden load unit 112a and the hidden load buffer 112a_b may identify an idle time when the load unit 111a and the load buffer 111a_b do not transmit the memory access request to the load engine 113a, and then the hidden load unit 112a and the hidden load buffer 112a_b may transmit the memory access request to the load engine 113a at the identified idle time. That is, the hidden load buffer 112a_b may operate only when an instruction issue operation is stalled in the load buffer 111a_b.

Referring to FIG. 7 again, the L0 memory 120 may be dedicated for the neural core 100 and located inside the neural core 100, and may receive all input data required for an operation from the outside and temporarily store the input data. Also, the L0 memory 120 may temporarily store the output data calculated by the neural core 100 in order to transmit the output data to the outside. The L0 memory 120 may serve as a cache memory of the neural core 100.

The L0 memory 120 may transmit the input activation Act_In to the activation buffer 150 by the activation LSU 140 and receive the output activation Act_Out. The L0 memory 120 may directly transmit and receive data to and from the processing unit 160 in addition to the activation LSU 140. That is, the L0 memory 120 may exchange data with each of the PE array 163 and the vector unit 164. The L0 memory 120 may be a memory corresponding to a neural core level. In this case, the L0 memory 120 may be a private memory of a neural core.

The L0 memory 120 may transmit data such as an activation or a weight through a data path. The L0 memory 120 may transmit and receive a synchronization signal through the L0 sync path that is a separate private path. The L0 memory 120 may exchange a synchronization signal with, for example, the LSU 110, the weight buffer 130, the activation LSU 140, and the processing unit 160 through the L0 sync path.

The weight buffer 130 may receive a weight from the L0 memory 120. The weight buffer 130 may transmit the weight to the processing unit 160. The weight buffer 130 may temporarily store the weight before transmitting the weight.

The input activation Act_In and the output activation Act_Out may refer to input values and output values of the layers of a neural network, respectively. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is updated in the deep learning training stage, and may be used to derive the output activation Act_Out via the updated value in the inference stage.

The activation LSU 140 may transmit the input activation Act_In from the L0 memory 120 to the activation buffer 150 and transmit the output activation Act_Out from the activation buffer 150 to the L0 memory. That is, the activation LSU 140 may perform both a load operation and a store operation of the activations.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array, which has a large amount of calculation, and may quickly receive the activation, thereby increasing the calculation speed of the neural core 100.

The processing unit 160 may be a module that performs calculations. The processing unit 160 may perform not only one-dimensional calculations but also two-dimensional matrix calculations such as convolution operations. The processing unit 160 may receive an input activation Act_In, multiply it by a weight, and then add it to generate an output activation Act_Out.

Hereinafter, the processing unit 160 in accordance with an embodiment will be described with reference to FIG. 10.

Figure 10:
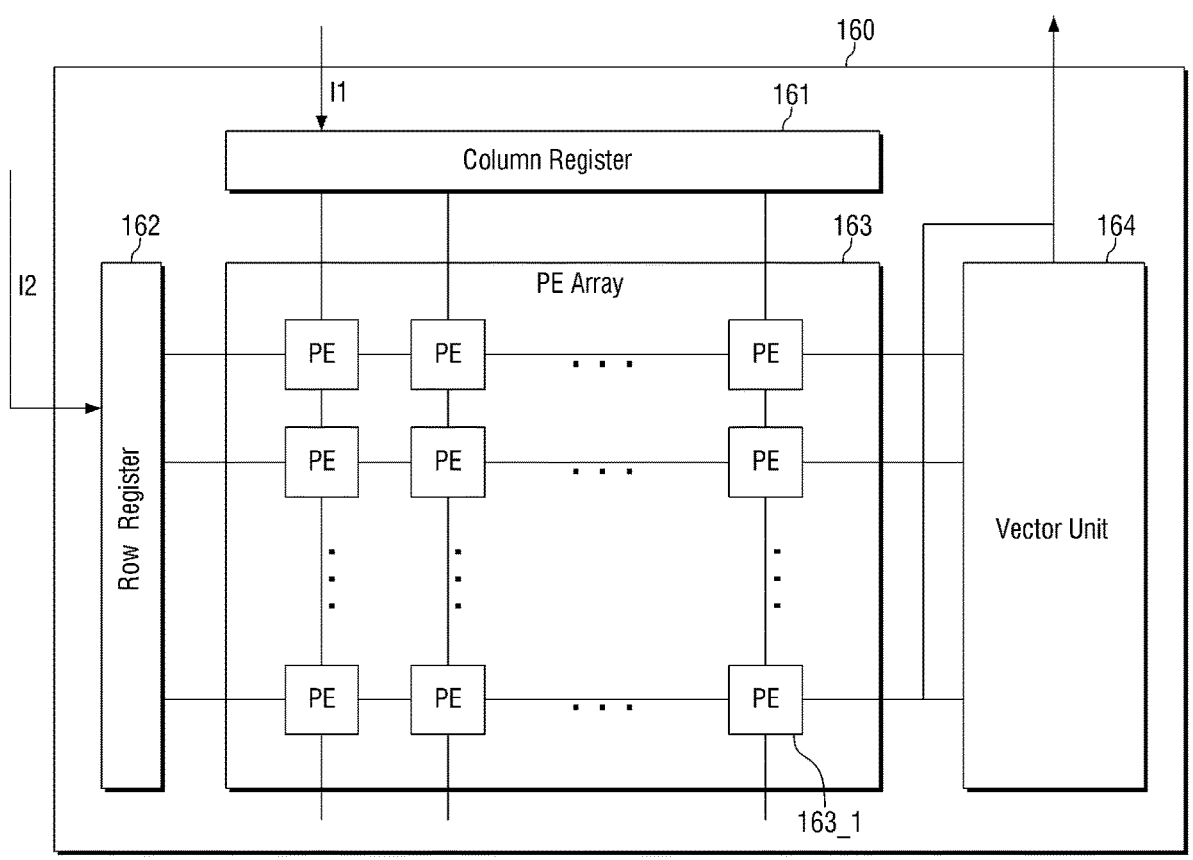
FIG. 10 is a block diagram for illustrating a processing unit in accordance with an embodiment.

FIG. 10 is a block diagram for illustrating the processing unit in accordance with an embodiment.

Referring to FIG. 7 and FIG. 10, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element 163_1. The processing elements 163_1 may be aligned with each other so that each of the processing elements 163_1 may perform multiplication of one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing element 163_1.

The row register 162 may receive a second input I2. The row register 162 may receive the second input I2, and distribute them to each row of the processing element 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Hereinafter, the L0 memory 120 in accordance with an embodiment will be described with reference to FIG. 11.

Figure 11:
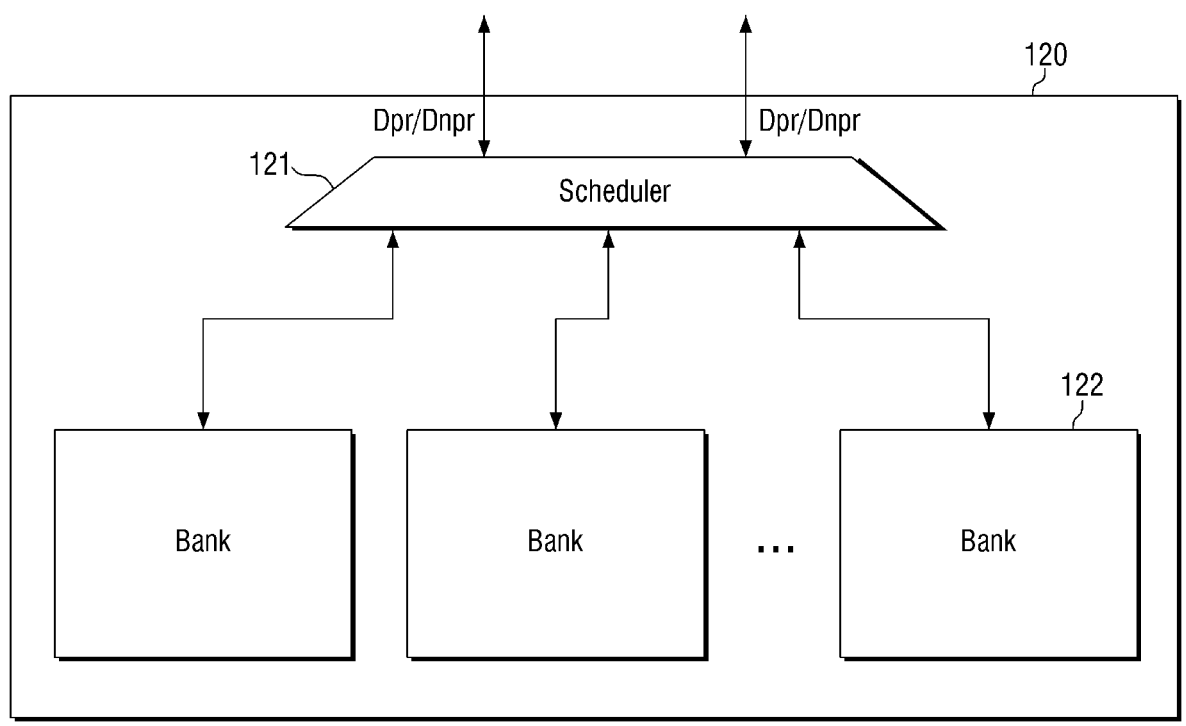
FIG. 11 is a block diagram for illustrating an L0 memory in accordance with an embodiment.

FIG. 11 is a block diagram for illustrating the L0 memory in accordance with an embodiment.

Referring to FIG. 11, the L0 memory 120 may include a scheduler 121 and one or more local memory banks 122.

When data is stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In some embodiments, the store engine 113b may store the data in a memory whose level is different from the level of the L0 memory 120. For example, the store engine 113b may store the data in off-chip memory 30, the L1 shared memory 400 or the shared memory 2000.

Referring to FIGS. 9 and 11, the scheduler 121 may receive the data Dpr and the data Dnpr loaded by the load engine 113a. The scheduler 121 may transmit the data Dpr and the loaded data Dnpr, which are fed in a round-robin manner, to the local memory banks 122 of the L0 memory 120, respectively. That is, since the scheduler 121 sequentially distributes data to the local memory banks 122 of the L0 memory 120, additionally processing the data Dnpr in addition to the data Dpr may cause delays in processing the data Dpr.

However, the neural processing device 1 in accordance with some embodiments of the disclosure may prevent processing of the data Dpr from being delayed even when the data Dnpr is additionally processed, by giving a high priority to the data Dpr.

This priority may be tagged by the load engine 113a. However, the embodiment is not limited thereto. That is, the load unit 111a and the hidden load unit 112a may determine in advance information on the priority and transmit the information.

The store engine 113b may receive a memory access request to store data Dpr and data Dnpr through the data channel 6100. In this case, the store engine 113*b* may quickly find data in the translation lookaside buffer 114 by using a translation table including the recently used virtual address and physical address. When the virtual address of the store engine 113*b* is not in the translation lookaside buffer 114, address translation information may be found in the shared memory 2000.

The data Dpr corresponds to the memory access request received from the store buffer 111*b_b*, and the data Dnpr corresponds to the memory access request received from the hidden store buffer 112*b_b*.

In this case, the store buffer 111*b_b* and the hidden store buffer 112*b_b* may not simultaneously transmit memory access requests to the store engine 113*b*. That is, the hidden store unit 112*b* and the hidden store buffer 112*b_b* may transmit the memory access requests to the store engine 113*b* by identifying the time when the store unit 111*b* and the store buffer 111*b_b* do not transmit the memory access requests to the store engine 113*b*. That is, the hidden store buffer 112*b_b* may operate only when an instruction issue operation is stalled in the store buffer 111*b_b*.

The scheduler 121 may receive the data Dpr and the store data Dnpr from the store engine 113*b*. The scheduler 121 may transmit the data Dpr and the data Dnpr input in a round-robin manner from the local memory banks 122 of the L0 memory 120 to the data channel 6100. That is, since the scheduler 121 sequentially fetches data from the local memory banks 122 of the L0 memory 120, and thus, when the additionally processing the data Dnpr may cause delays in processing the data Dpr.

However, the neural processing device 1 in accordance with some embodiments of the disclosure may prevent processing of the data Dpr from being delayed even when the data Dnpr is additionally processed, by giving a high priority to the data Dpr.

This priority may be tagged by the store engine 113*b*. However, the embodiment is not limited thereto. That is, the store unit 111*b* and the hidden store unit 112*b* may determine in advance information on the priority and transmit the information.

In this case, the load unit 111*a*, the load buffer 111*a_b*, the store unit 111*b*, the store buffer 111*b_b*, the load engine 113*a*, the store engine 113*b*, and the translation lookaside buffer 114 may be included in the main LSU 111.

Meanwhile, the hidden load unit 112*a*, the hidden load buffer 112*a_b*, the hidden store unit 112*b*, the hidden store buffer 112*b_b*, the load engine 113*a*, the store engine 113*b*, and the translation lookaside buffer 114 may be included in the hidden LSU 112.

That is, the main LSU 111 and the hidden LSU 112 may share the load engine 113*a*, the store engine 113*b*, and the translation lookaside buffer 114. At least one of the load engine 113*a*, the store engine 113*b*, or the translation lookaside buffer 114 may be implemented in hardware.

The load engine 113*a* and the store engine 113*b* may share some of the same hardware because the main LSU 111 and the hidden LSU 112 have different use times. Accordingly, resource utilization efficiency of the embodiment may greatly increase.

Hereinafter, the local memory bank 122 in accordance with an embodiment will be described with reference to FIG. 12.

Figure 12:
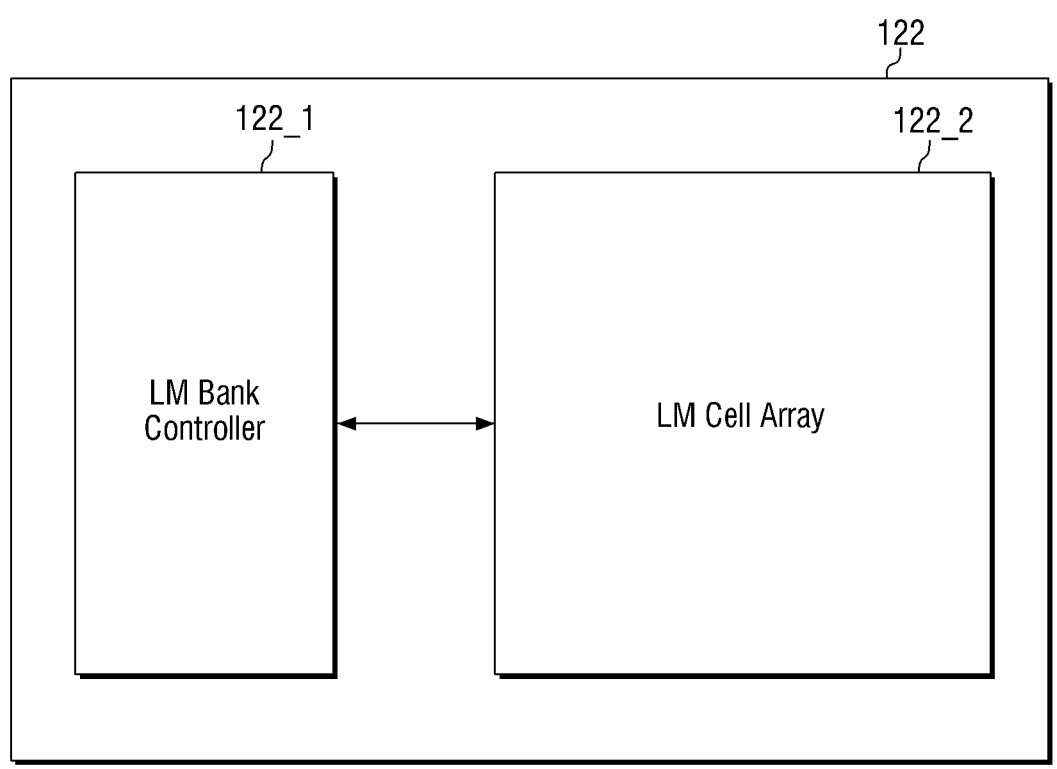
FIG. 12 is a block diagram for illustrating the local memory bank in accordance with an embodiment.

FIG. 12 is a block diagram for illustrating the local memory bank in accordance with an embodiment.

Referring to FIG. 12, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Hereinafter, a structure of the neural processing device 1 in accordance with an embodiment will be described with reference to FIG. 13.

Figure 13:
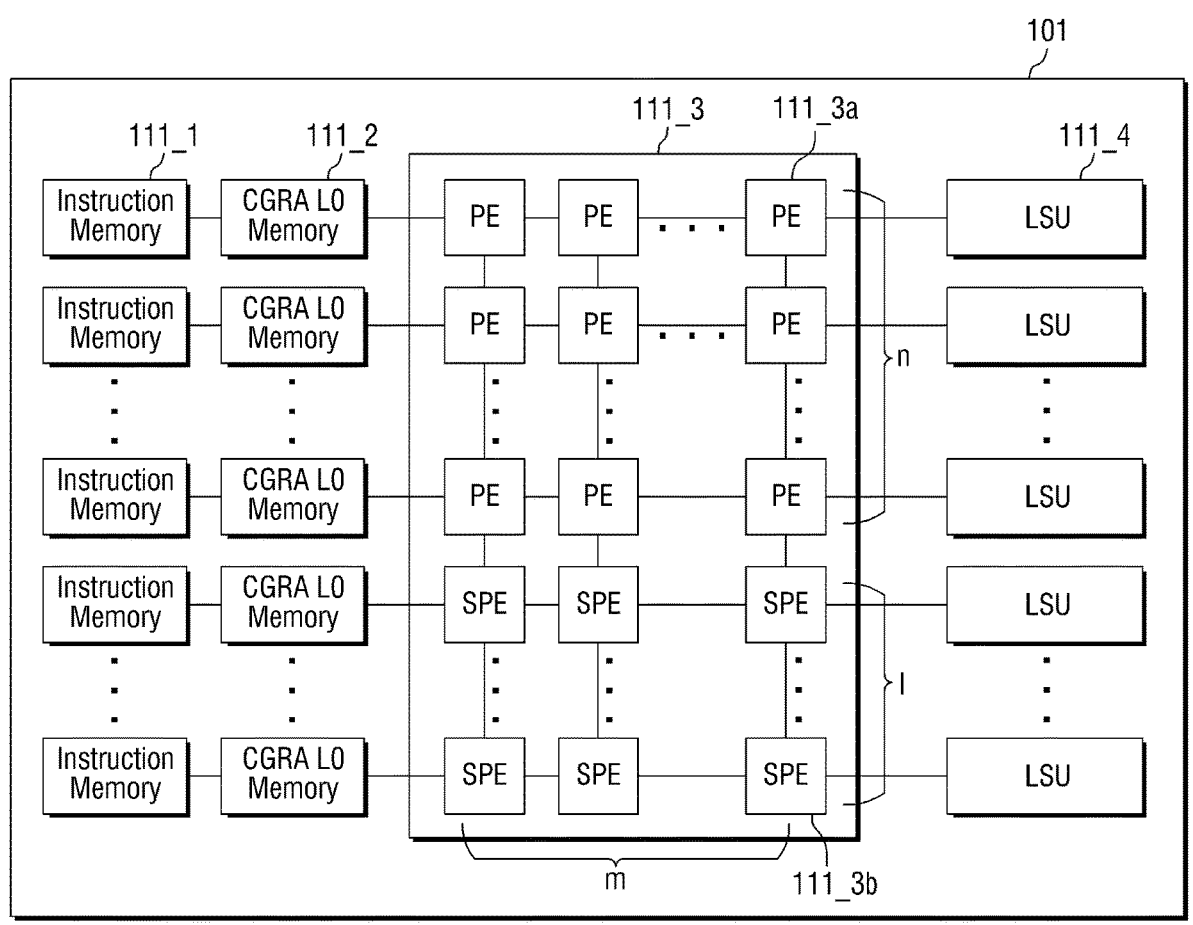
FIG. 13 is a block diagram for illustrating a structure of the neural processing device in accordance with an embodiment.

FIG. 13 is a block diagram for illustrating a structure of the neural processing device in accordance with an embodiment.

Referring to FIG. 13, the neural core 101 may have a coarse grained reconfigurable architecture (CGRA) structure unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store the instructions therein and provide the stored instructions to the PE array 111_3. In this case, the instruction may instruct operations of respective processing elements 111_3*a* included in the PE array 111_3.

The CGRA L0 memory 111_2 is located inside the neural core 101, and the neural core 101 may receive all input data required for operations from the outside and temporarily store the data. In addition, the CGRA L0 memory 111_2 may temporarily store output data calculated by the neural core 101 to transmit the output data to the outside. The CGRA L0 memory 111_2 may serve as a cache memory of the neural core 101.

The CGRA L0 memory 111_2 may transmit and receive data to and from the PE array 111_3. The CGRA L0 memory 111_2 may correspond to L0 (level 0) lower than L1. In this case, the L0 memory may be a private memory of the neural core 101 that is not shared. The CGRA L0 memory 111_2 may transmit data such as an activation or a weight and a program to the PE array 111_3.

The PE array 111_3 may perform a calculation. The PE array 111_3 may perform not only a one-dimensional calculation but also two-dimensional or more matrix/tensor calculation. The PE array 111_3 may include a plurality of processing elements 111_3*a* and specific processing elements 111_3*b*.

The processing elements 111_3*a* and the specific processing elements 111_3*b* may be arranged in rows and columns. The processing elements 111_3*a* and the specific processing elements 111_3*b* may be arranged in m columns. Also, the processing elements 111_3*a* may be arranged in n rows, and the specific processing elements 111_3*b* may be arranged in 1 rows. Accordingly, the processing elements 111_3*a* and the specific processing elements 111_3*b* may be arranged in (n+1) rows and m columns.

The LSU 111_4 may receive at least one of data, a control signal, or a synchronization signal from the outside through the local interconnection 200. The LSU 111_4 may transmit at least one of the received data, the received control signal, or the received synchronization signal to the CGRA L0 memory 111_2. Similarly, the LSU 111_4 may transmit at least one of the data, the control signal, or the synchronization signal to the outside through the local interconnection 200.

The neural core 101 may have a CGRA structure. Accordingly, each of the processing elements 111_3a and each of the specific processing elements 111_3b of the PE array 111_3 in the neural core 101 may be the CGRA L0 memory 111_2, the instruction memory 111_1, and the LSU 111_4. That is, the processing elements 111_3a and the specific processing elements 111_3b do not have to be connected to all of the CGRA L0 memory 111_2, the instruction memory 111_1, and the LSU 111_4, but may be connected to some of the CGRA L0 memory 111_2, the instruction memory 111_1, and the LSU 111_4.

Also, the processing element 111_3a and the specific processing element 111_3b may be different types from each other. Accordingly, the CGRA L0 memory 111_2, the instruction memory 111_1, and the LSU 111_4 which are connected to the processing element 111_3a may be different the CGRA L0 memory 111_2, the instruction memory 111_1, and the LSU 111_4 which are connected to the specific processing element 111_3b.

The neural core 101 having a CGRA structure, according to the disclosure may perform a high-level parallel calculation and may directly exchange data between the processing element 111_3a and the specific processing element 111_3b, and thus, power consumption may be reduced. In addition, by including two or more types of processing elements 111_3a, the neural core may make optimization according to various calculations.

For example, when the processing element 111_3a performs a two-dimensional calculation, the specific processing element 111_3b may perform a one-dimensional calculation. However, the embodiment is not limited thereto.

Hereinafter, memory reconstruction of the neural processing system NPS in accordance with an embodiment will be described with reference to FIG. 14.

Figure 14:
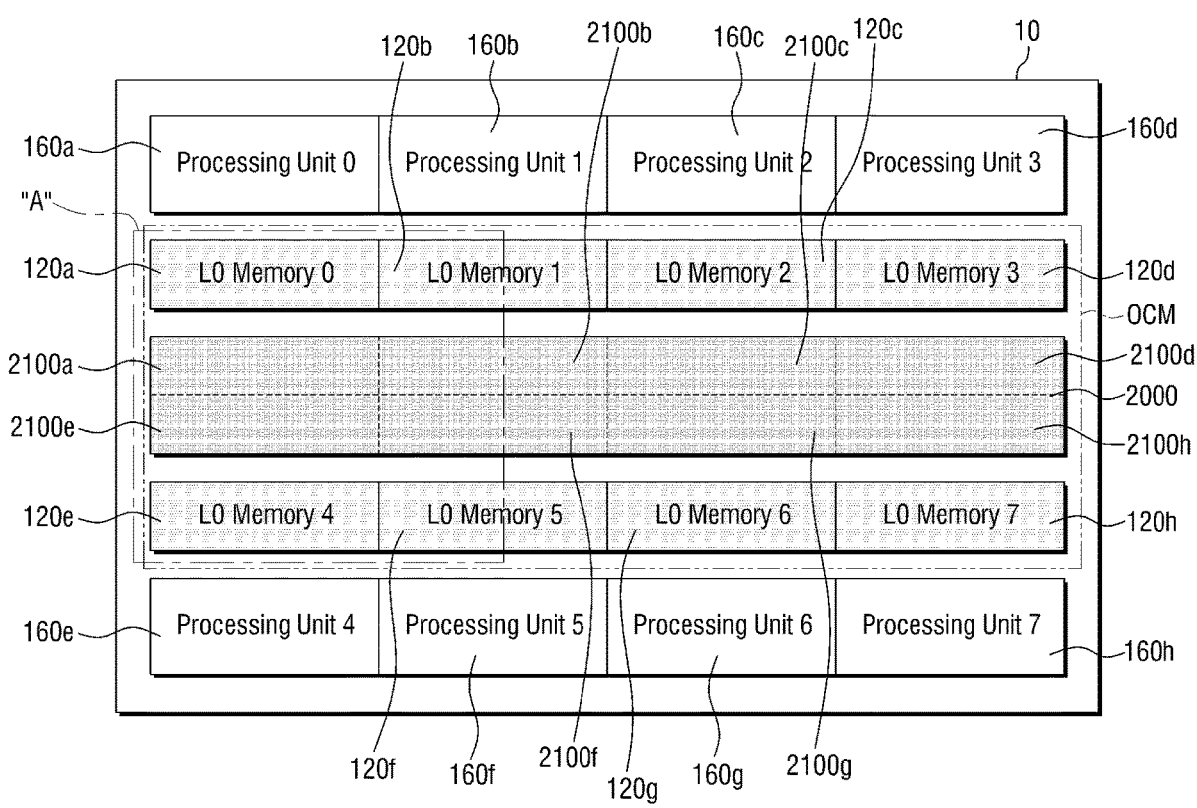
FIG. 14 is a block diagram illustrating memory reconfiguration of the neural processing system in accordance with an embodiment.

FIG. 14 is a block diagram for illustrating memory reconstruction of a neural processing system in accordance with an embodiment.

Referring to FIG. 14, the neural core SoC 10 may include first to eighth processing units 160a to 160h and an on-chip memory OCM. Although FIG. 14 illustrates eight processing units as an example, this is merely illustrative, and the number of processing units may vary as desired.

The on-chip memory OCM may include first to eighth L0 memories 120a to 120h and the shared memory 2000.

The first to eighth L0 memories 120a to 120h may be used as private memories of the first to eighth processing units 160a to 160h, respectively. That is, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight and may be equal to the number of processing units and the number of L0 memories.

The shared memory 2000 may operate in one of two types of on-chip memory formats. That is, the shared memory 2000 may operate in either an L0 memory format or a global memory format. That is, the shared memory 2000 may implement two types of logical memories with one piece of hardware.

When the shared memory 2000 is implemented in the L0 memory format, the shared memory 2000 may operate as a private memory is a private memory of each of the first to eighth processing units 160a to 160h like the first to eighth L0 memories 120a to 120h. The L0 memory may operate at a relatively high speed compared to the global memory, and the shared memory 2000 may also use a relatively faster clock when operating in the L0 memory format.

When the shared memory 2000 is implemented in the global memory format, the shared memory 2000 may operate as a common memory used by the first processing unit 160a and the second processing unit 160b. In this case, the shared memory 2000 may be shared not only by the first to eighth processing units 160a to 160h but also by the first to eighth L0 memories 120a to 120h.

The global memory may generally use a lower clock than the L0 memory but is not limited thereto. When the shared memory 2000 operates in a global memory format, the first to eighth processing units 160a to 160h may share the shared memory 2000. In this case, the shared memory 2000 may be connected to the volatile memory 32 of FIG. 2 through the global interconnection 6000 and may operate as a buffer of the volatile memory 32.

At least a part of the shared memory 2000 may operate in the L0 memory format, and the others may operate in the global memory format. That is, the entire shared memory 2000 may operate in the L0 memory format, or the entire shared memory 2000 may operate in the global memory format. Alternatively, a part of the shared memory 2000 may operate in the L0 memory format, and the others may operate in the global memory format.

Hereinafter, memory reconfiguration of the neural processing system NPS in accordance with an embodiment will be described with reference to FIG. 15.

Figure 15:
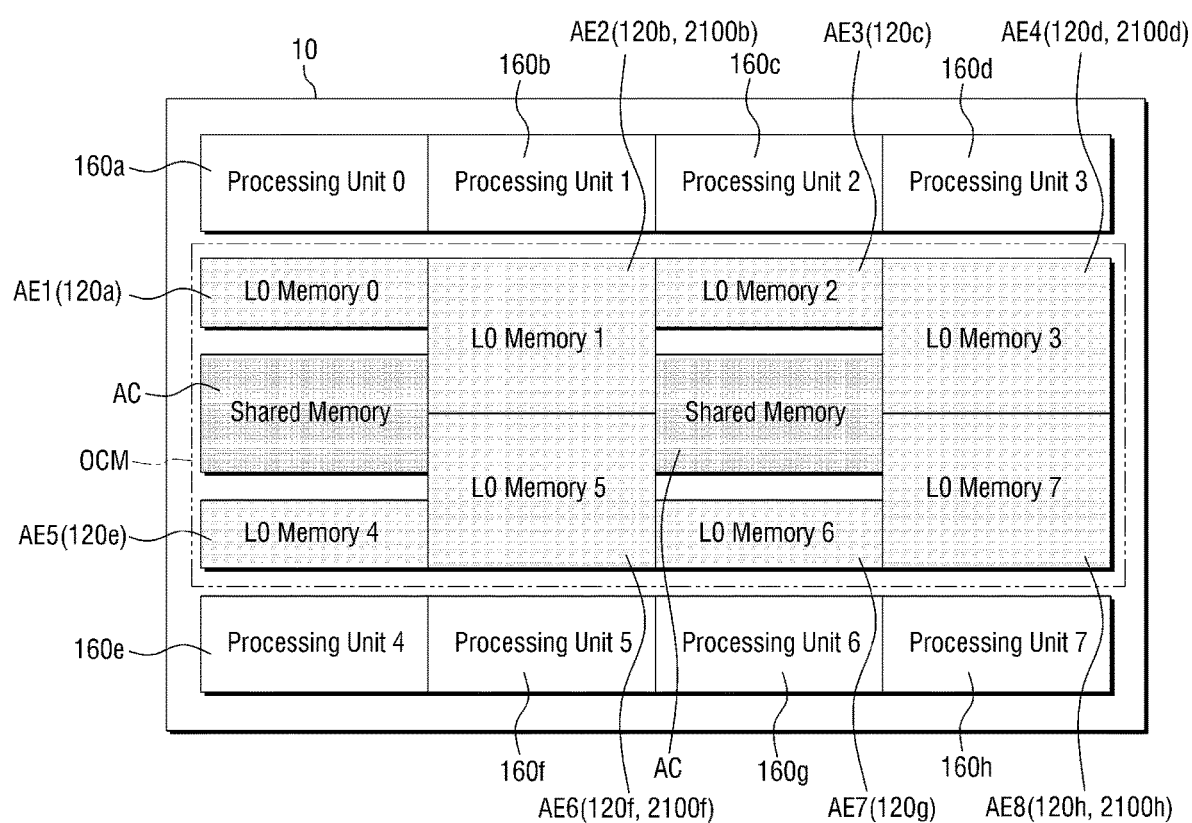
FIG. 15 is a block diagram illustrating an exemplary memory reconfiguration of the neural processing system in accordance with an embodiment.

FIG. 15 is a block diagram illustrating an exemplary memory reconfiguration of a neural processing system in accordance with an embodiment.

Referring to FIGS. 14 and 15, first, third, fifth, and seventh private areas AE1, AE3, AE5, and AE7 of the first, third, fifth, and seventh processing units 160a, 160c, 160e, and 160g may respectively include the first, third, fifth, and seventh L0 memories 120a, 120c, 120e, and 120g. In addition, second, fourth, sixth, and eighth private areas AE2, AE4, AE6, AE8 of the second, fourth, sixth, and eighth processing units 160b, 160d, 160f, and 160h may respectively include the second, fourth, sixth, and eighth L0 memories 120b, 120d, 120f, and 120h. In addition, the second, fourth, sixth, and eighth private areas AE2, AE4, AE6, and AE8 may include second, fourth, sixth, and eighth memory units 2100b, 2100d, 2100f, and 2100h. First, third, fifth, and seventh memory units 2100a, 2100c, 2100e, and 2100g of the shared memory 2000 may be used as a common area AC.

The common area AC may be shared by the first to eighth processing units 160a to 160h. The second private area AE2 may include the second L0 memory 120b and the second memory unit 2100b. The second private area AE2 may be an area in which the second L0 memory 120b and the second memory unit 2100b, that are separated in hardware, operate in the same manner to logically operate as one L0 memory. The fourth, sixth, and eighth private areas AE4, AE6, and AE8 may also operate in the same manner as the second private area AE2.

The shared memory 2000 according to the embodiment may convert an area corresponding to each processing unit into a logical L0 memory and a logical global memory in an optimized ratio. The shared memory 2000 may perform a ratio adjustment at run time.

That is, each processing unit may perform the same operation in some cases but may perform different operations in other cases. In this case, capacities of the L0 memory and the global memory required for an operation performed by each processing unit are inevitably different every time. Accordingly, when a composition ratio between the L0 memory and the shared memory is set to be fixed as in the known on-chip memory, a calculation assigned to each processing unit may be inefficiently performed.

Accordingly, the shared memory 2000 of the neural processing device 1 may set an optimal ratio between the L0 memory and the global memory according to the calculation during run time, and thus, efficiency and speed of an operation may increase.

Figure 16:
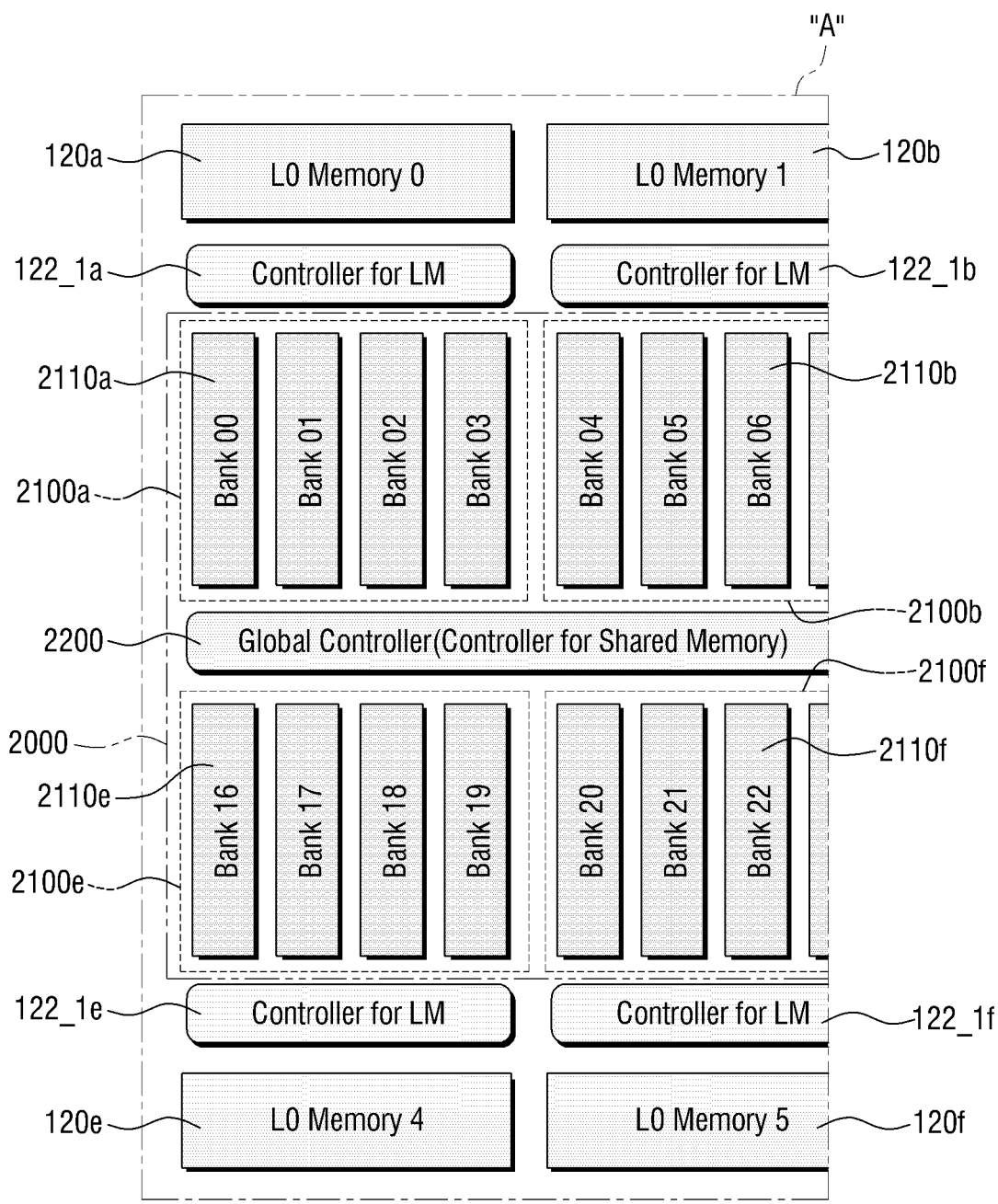
FIG. 16 is an enlarged block diagram of a portion A in accordance with an embodiment.

FIG. 16 is an enlarged block diagram of a portion A in accordance with an embodiment.

Referring to FIGS. 14 and 16, the shared memory 2000 may include a first L0 memory controller 122_1a, a second L0 memory controller 122_1b, a fifth L0 memory controller 122_1e, and a sixth L0 memory controller 122_1f, first to eighth memory units 2100a to 2100h, and a global controller 2200. Other L0 memory controllers not illustrated therein may also be included in the embodiment, but descriptions thereof are omitted for the sake of convenience.

The first L0 memory controller 122_1a may control the first L0 memory 120a. Also, the first L0 memory controller 122_1a may control the first memory unit 2100a. Specifically, when the first memory unit 2100a is implemented in a logical L0 memory format, the first L0 memory controller 122_1a may control the first memory unit 2100a.

The second L0 memory controller 122_1b may control the second L0 memory 120b. Also, the second L0 memory controller 122_1b may control the second memory unit 2100b. That is, when the second memory unit 2100b is implemented in a logical L0 memory format, the first L0 memory controller 122_1a may control the second memory unit 2100b.

The fifth L0 memory controller 122_1e may control the fifth L0 memory 120e. Also, the fifth L0 memory controller 122_1e may control the fifth memory unit 2100e. That is, when the fifth memory unit 2100e is implemented in a logical L0 memory format, the fifth L0 memory controller 122_1e may control the fifth memory unit 2100e.

The sixth L0 memory controller 122_1f may control the sixth L0 memory 120f. Also, the sixth L0 memory controller 122_1f may control the sixth memory unit 2100f. That is, when the sixth memory unit 2100f is implemented in a logical L0 memory format, the sixth L0 memory controller 122_1f may control the sixth memory unit 2100f.

The global controller 2200 may control all of the first to eighth memory units 2100a to 2100h. Specifically, when the first to eighth memory units 2100a to 2100h logically operate in a global memory format (that is, when not logically operating in the L0 memory format), the global controller 2200 may control the first memory unit to the eighth memory unit 2100a to 2100h.

That is, the first to eighth memory units 2100a to 2100h may be controlled by the first to eighth L0 memory controllers 122_1a to 122_1h or the global controller 2200 depending on types of memories that are logically implemented.

When the L0 memory controllers including the first, second, fifth, and sixth L0 memory controllers 122_1a, 122_1b, 122_1e, and 122_1f control the first to eighth memory units 2100a to 2100h, the first to eighth L0 memory controllers 122_1a to 122_1h control the first to eighth memory units 2100a to 2100h in the same manner as the first to eighth L0 memories 120a to 120h, and thus, the first to eighth memory units 2100a to 2100h may be controlled as private memories of the first to eighth processing units 160a to 160h. Accordingly, the first to eighth memory units 2100a to 2100h may operate at clock frequencies corresponding to clock frequencies of the first to eighth processing units 160a to 160h.

L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 1 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 16 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may logically operate in the L0 memory format or logically operate in the global memory format. In this case, the first memory bank 2110a may also operate independently of other memory banks in the first memory unit 2100a. However, the embodiment is not limited thereto.

When the memory banks operate independently, the first memory unit 2100a may include a first area operating in the same manner as the first L0 memory 120a and a second area operating in a different manner from the first L0 memory 120a. In this case, the first area and the second area do not necessarily coexist, and any one area may occupy all of the first memory unit 2100a.

Similarly, the second memory unit 2100b may include a third area operating in the same manner as the second L0 memory 120b and a fourth area operating in a different manner from the second L0 memory 120b. In this case, the third area and the fourth area do not necessarily coexist, and any one area may occupy all of the first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, the known system-on-chip has a configuration in which an on-chip memory except for a high-speed L0 memory is composed of a high-density low-power static random access memory (SRAM). This is because the SRAM has high efficiency in terms of chip area and power consumption for required capacity. However, when more data is needed faster than the data required by capacity of a pre-determined L0 memory, a processing speed of the known on-chip memory is inevitably slowed down significantly, and even when a global memory is not needed, there is no way to utilize the remaining global memory, resulting in inefficiency.

On the other hand, the shared memory 2000 in accordance with some embodiments may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 according to the embodiment may acquire an optimal memory configuration ratio according to a calculation during run time to perform faster and more efficient operation. In a processing unit specialized in artificial intelligence, required sizes of the L0 memory and global memory may change in units of specific application. Furthermore, when a deep learning network is used in the same application, the required sizes of the L0 memory and the global memory may be different for each layer. In the shared memory 2000 according to the embodiment, the memory configuration ratio may be changed during run time even when a calculation step according to each layer is changed, and thus, a fast and efficient deep learning operation may be performed.

Hereinafter, the first memory bank 2110a in accordance with an embodiment will be described with reference to FIG. 17.

Figure 17:
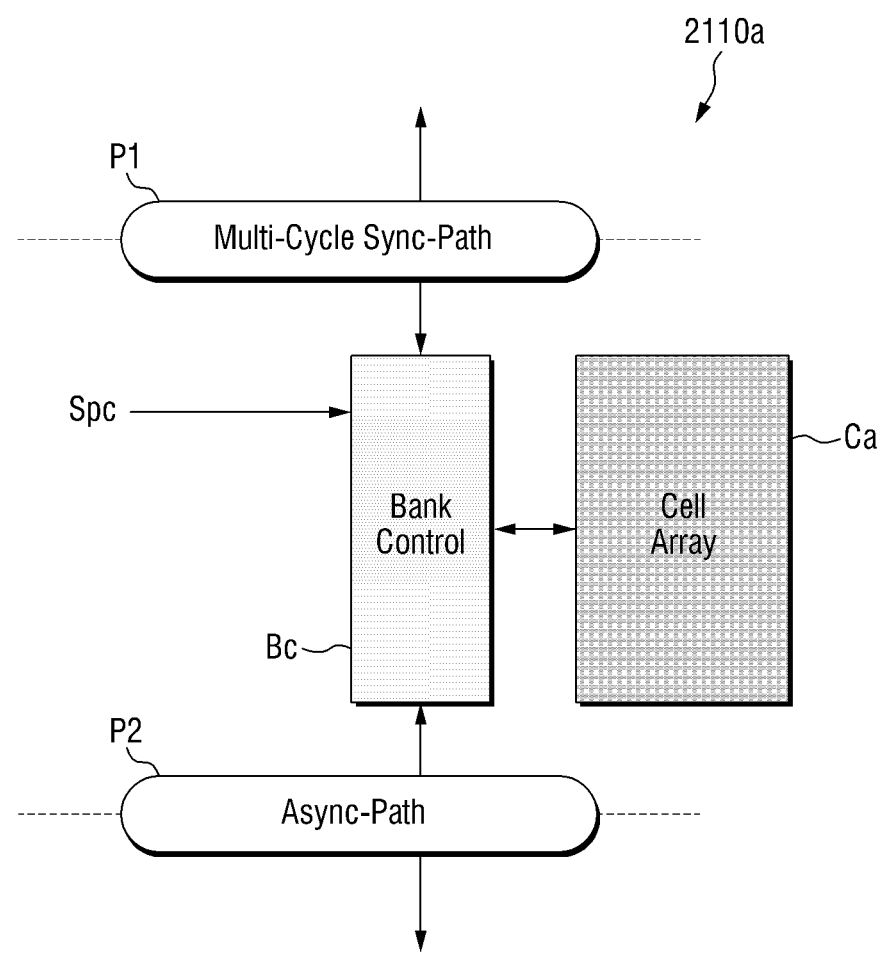
FIG. 17 is a diagram for illustrating the first memory bank in accordance with an embodiment.

FIG. 17 is a diagram for illustrating the first memory bank in accordance with an embodiment. Although FIG. 17 illustrates the first memory bank 2110a, other memory banks may also have the same structure as the first memory bank 2110a.

Referring to FIG. 17, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 14.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 17, the operating clock frequency of the first path unit P1 may be 1.5 GHz, as an example. This may be twice the frequency of 750 MHz of the bank controller Bc. However, the embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 16.

The second path unit P2 may form an Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In this case, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to exist for each memory bank. In other words, the bank controller Bc is not a part for scheduling but serves to transfer signals, and thus, is not an essential part for each memory bank having two ports. Therefore, one bank controller Bc can control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 16 and FIG. 17, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 17, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when the amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Hereinafter, a program load operation of the neural processing device 1 in accordance with an embodiment will be described with reference to FIG. 18.

Figure 18:
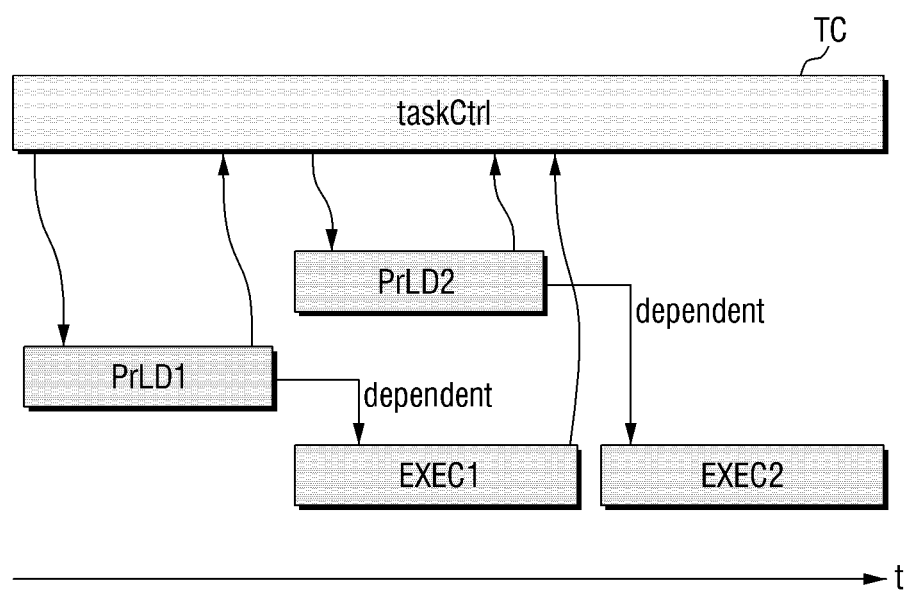
FIG. 18 is a time diagram illustrating in time series a program load operation of a neural processing device in accordance with an embodiment.

FIG. 18 is a time diagram illustrating in time series a program load operation of the neural processing device in accordance with an embodiment.

Referring to FIG. 18, a first program loading PrLD1 may be performed first by the task controller TC. The first program loading is required for a first work execution EXEC1 and may load a program or a program instruction for a deep learning operation. The first program loading PrLD1 has to be executed earlier than the first work execution EXEC1, and thus, the first work execution EXEC1 may depend on the first program loading PrLD1.

The neural processing device 1 may execute the second program loading PrLD2 after the first work execution EXEC1 is completed. In contrast to this, the neural core 100 according to the embodiment may execute the second program loading PrLD2 in parallel with the first work execution EXEC1 of a deep learning operation. Accordingly, the second work execution EXEC2 may start immediately when the first work execution EXEC1 is completed. Through this, the neural core 100 according to the embodiment may dramatically increase the speed of the deep learning operation.

Hereinafter, a data prefetch operation of the neural processing device 1 in accordance with an embodiment will be described with reference to FIG. 19.

Figure 19:
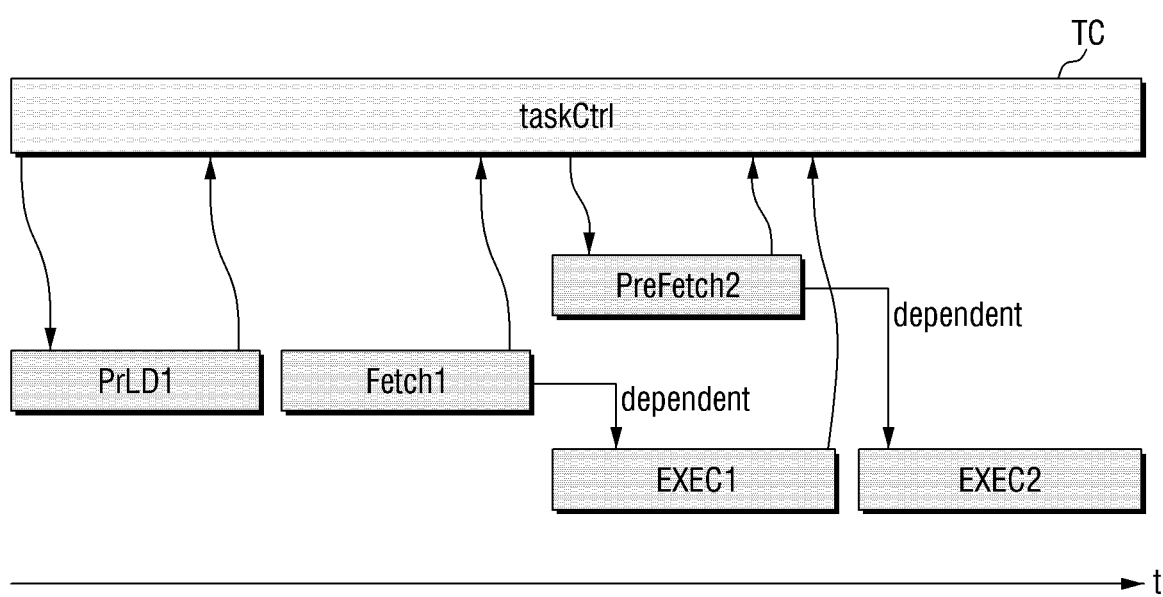
FIG. 19 is a time diagram illustrating in time series a data prefetch operation of a neural processing device in accordance with an embodiment.

FIG. 19 is a time diagram illustrating in time series a data prefetch operation of the neural processing device in accordance with an embodiment.

Referring to FIG. 19, the first program loading PrLD1 may be performed first by the task controller TC. Subsequently, a first fetch Fetch1 may be performed. The first fetch Fetch1 may be fetching data for deep learning and inference.

The first work execution EXEC1 may depend on load of a program and data. Similarly, the second work execution EXEC2 may depend on load of data in the same manner as a second prefetch PreFetch2. The second prefetch PreFetch2 may indicate fetching of kernel data of a next layer of, for example, a convolutional neural network (CNN) or long short-term memory (LSTM).

The neural processing device 1 may perform the second prefetch PreFetch2 for fetching in advance data corresponding to the second work execution EXEC2 during the first work execution EXEC1 such that the second work execution EXEC2 starts as soon as the first work execution EXEC1 is completed. By doing so, a processing speed of the neural processing device 1 may be further increased.

Hereinafter, a software hierarchy of the neural processing device 1 in accordance with an embodiment will be described with reference to FIG. 20.

Figure 20:
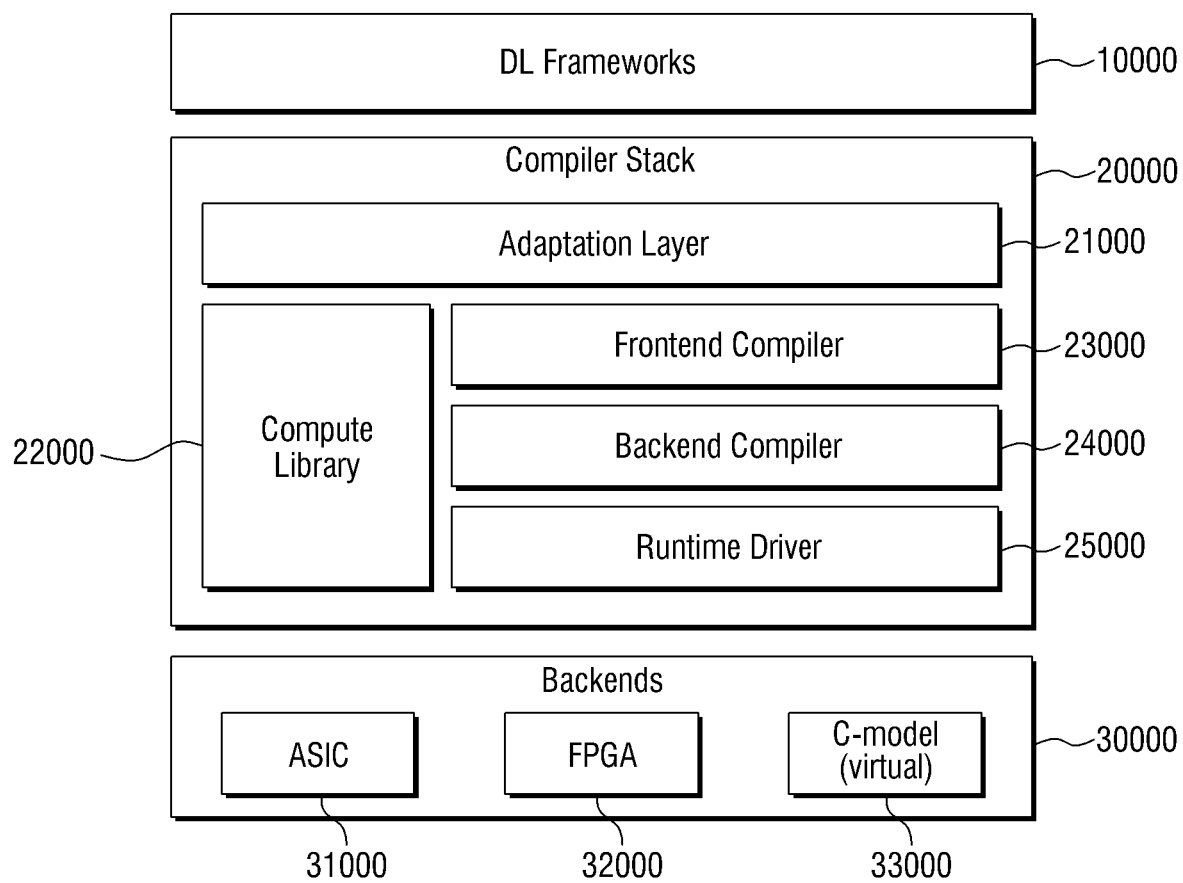
FIG. 20 is a block diagram for illustrating a software hierarchy of a neural processing device in accordance with an embodiment.

FIG. 20 is a block diagram for illustrating a software hierarchy of a neural processing device in accordance with an embodiment.

Referring to FIG. 20, the software hierarchy of the neural processing device 1 in accordance with an embodiment may include a DL framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert the type of model into a required type.

The front-end compiler 23000 may convert various neural network models and graphs transferred from the adaptation layer 21000 into a constant intermediate representation IR. The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Hereinafter, deep learning calculations performed by the neural processing device 1 in accordance with an embodiment will be described with reference to FIG. 21.

Figure 21:
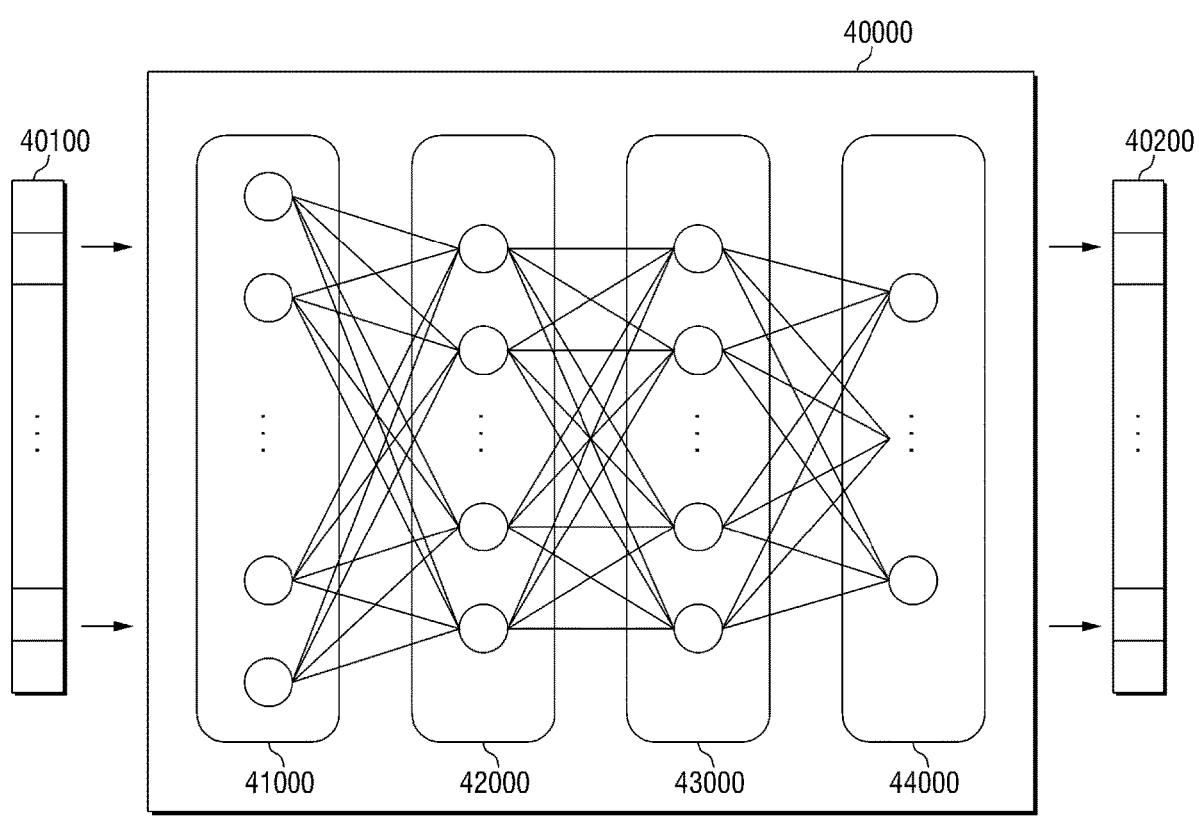
FIG. 21 is a conceptual diagram for illustrating deep learning calculations performed by a neural processing device in accordance with an embodiment.

FIG. 21 is a conceptual diagram for illustrating deep learning calculations performed by a neural processing device in accordance with an embodiment.

Referring to FIG. 21, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

The neural processing device 1 may implement the form of such an artificial neural network model 40000 and perform calculations. For example, the artificial neural network model 40000 may receive an input image, and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 21, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device 1 may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Hereinafter, training and inference operations of a neural network of the neural processing device 1 in accordance with an embodiment will be described with reference to FIG. 22.

Figure 22:
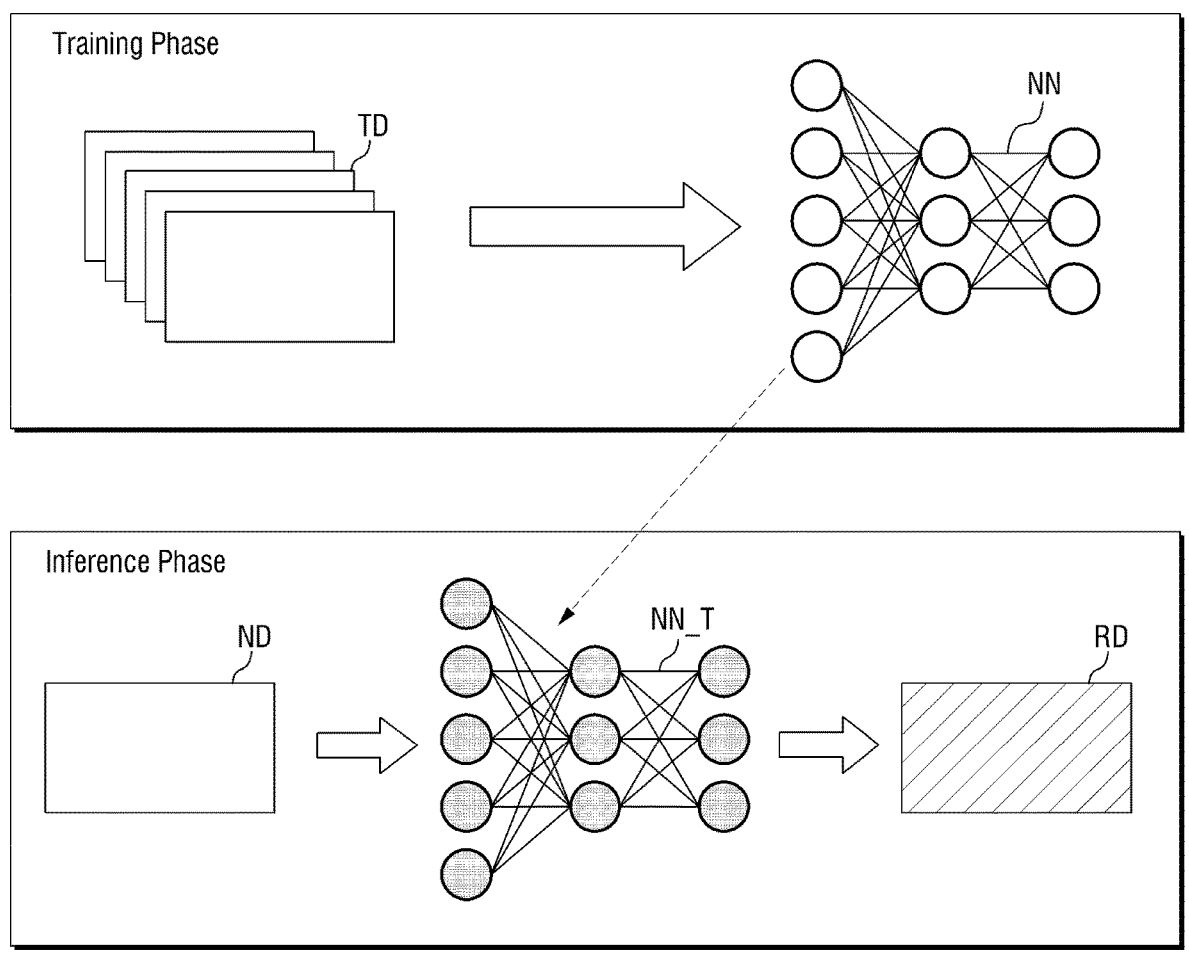
FIG. 22 is a conceptual diagram for illustrating training and inference operations of a neural network of a neural processing device in accordance with an embodiment.

FIG. 22 is a conceptual diagram for illustrating training and inference operations of a neural network of a neural processing device in accordance with an embodiment.

Referring to FIG. 22, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, the neural processing device 1 in accordance with some embodiments of the disclosure will be described with reference to FIGS. 23 and 24. Redundant descriptions thereof may be simplified or omitted.

Hereinafter, the main LSU 111 and the hidden LSU 112 of the neural processing device 1 in accordance with an embodiment will be described with reference to FIGS. 23 and 24.

Figure 23:
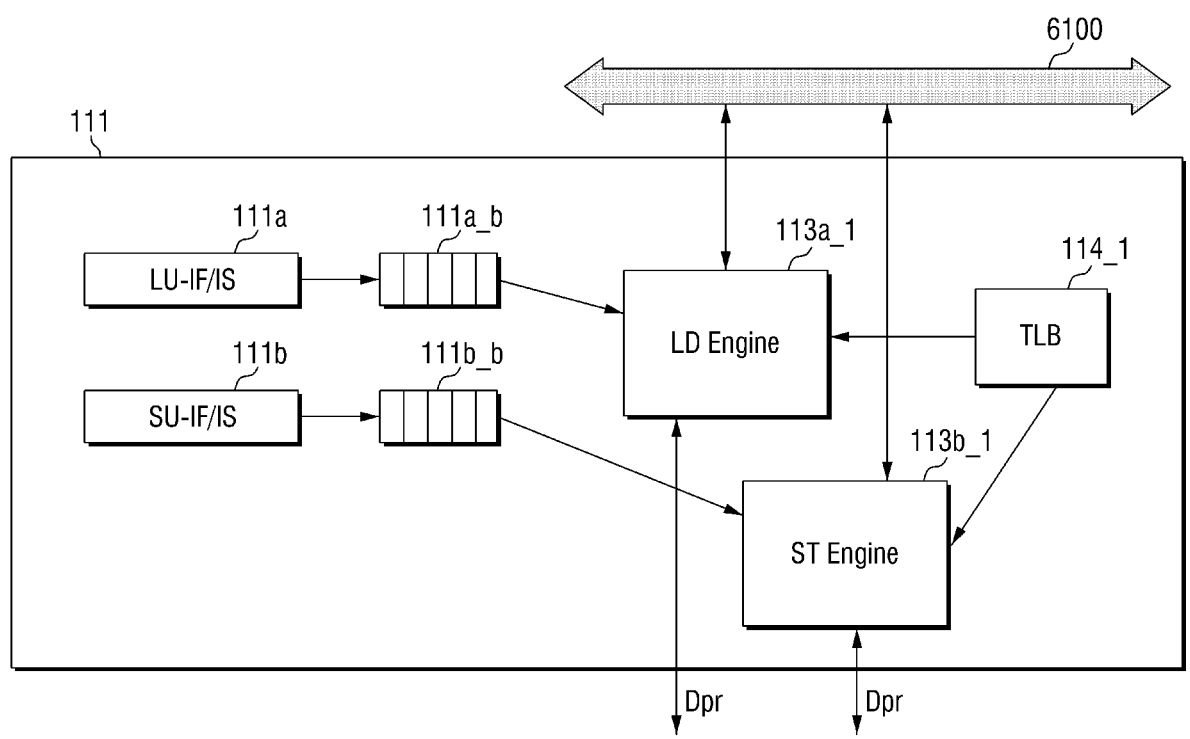
FIG. 23 is a block diagram for illustrating a main LSU of a neural processing device in accordance with an embodiment.
Figure 24:
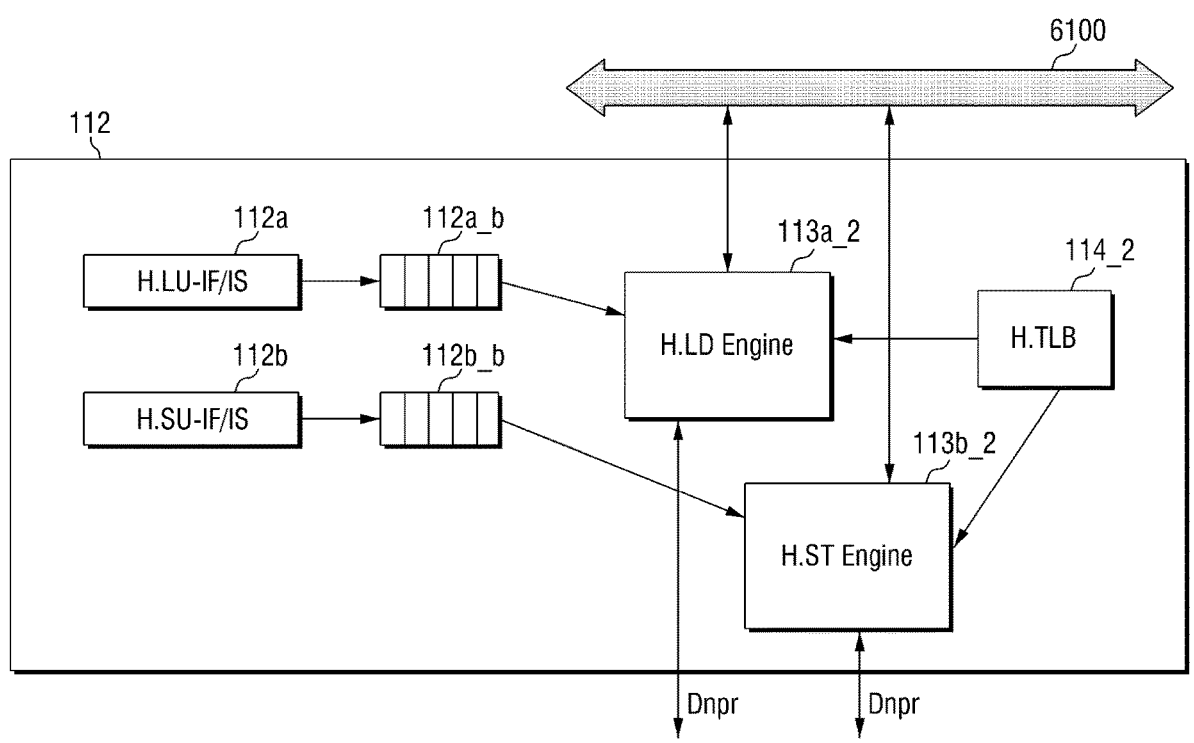
FIG. 24 is a block diagram for illustrating a hidden LSU of a neural processing device in accordance with an embodiment.

FIG. 23 is a block diagram for illustrating the main LSU of the neural processing device in accordance with an embodiment, and FIG. 24 is a block diagram for illustrating a hidden LSU of the neural processing device in accordance with an embodiment.

Referring to FIGS. 23 and 24, the LSU of the neural processing device 1 in accordance with some embodiments of the disclosure may be separated in hardware. That is, the main LSU 111 may include the load unit 111*a*, the store unit 111*b*, the load buffer 111*a_b*, the store buffer 111*b_b*, a first load engine 113*a*_1, a first store engine 113*b*_1, and a first translation lookaside buffer 114_1.

In addition, the hidden LSU 112 may include the hidden load unit 112*a*, the hidden store unit 112*b*, the hidden load buffer 112*a_b*, the hidden store buffer 112*b_b*, a second load engine 113*a*_2, a second store engine 113*b*_2, and a second translation lookaside buffer 114_2. The second load engine 113*a*_2, the second store engine 113*b*_2, and the second translation lookaside buffer 114_2 may be a hidden load engine, a hidden store engine and hidden translation lookaside buffer, respectively.

According to the embodiment, the main LSU 111 and the hidden LSU 112 are physically separated from each other to reduce design difficulty of the neural core 100, and the load engine 113*a* and the store engine 113*b* are not shared with each other to maintain durability for a long time. However, the scheduler 121 has the same setting, and thus, a more accurate numerical value may be obtained.

Hereinafter, the neural processing device 1 in accordance with some embodiments of the disclosure will be described with reference to FIGS. 7, 25A, and 25B. Redundant descriptions thereof will be simplified or are omitted.

Hereinafter, the neural processing device 1 and the L0 Memory 120 in accordance with an embodiment will be described with reference to FIGS. 25A and 25B.

Figure 25A:
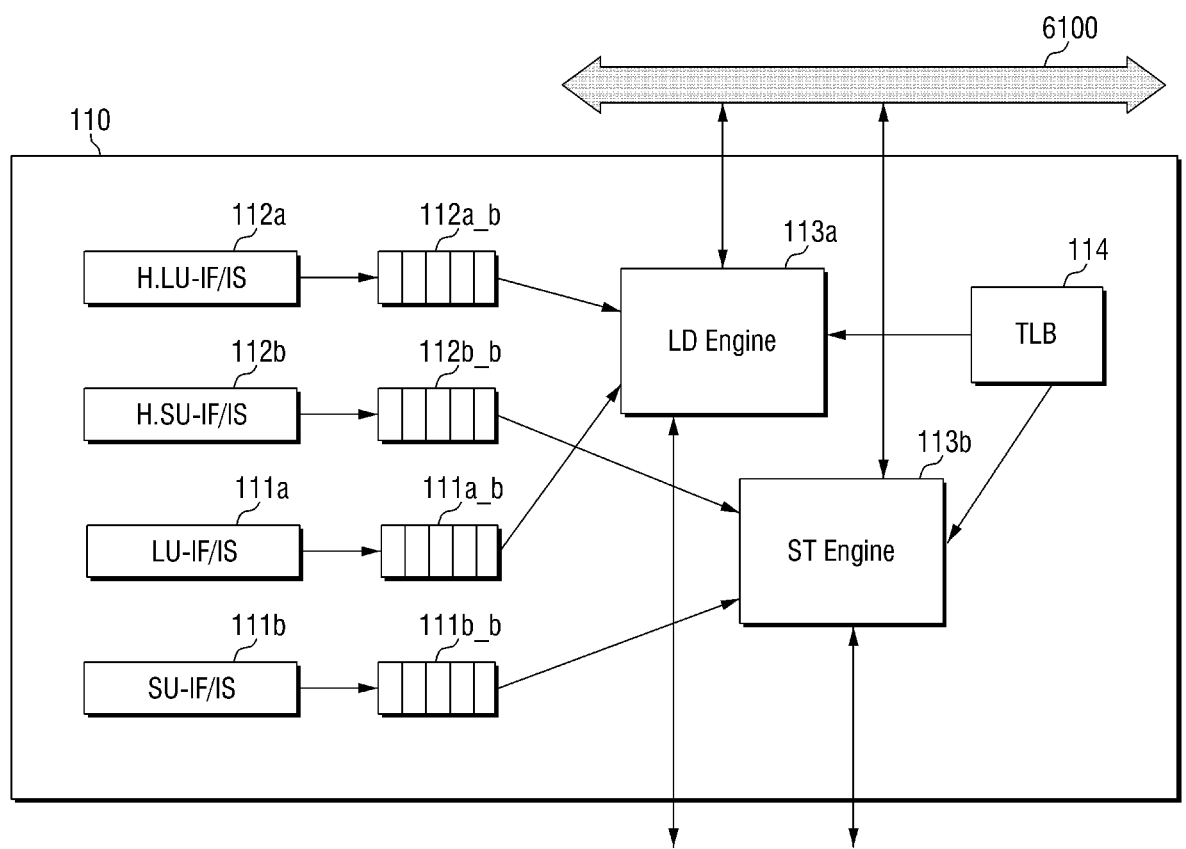
FIG. 25A is a block diagram illustrating a neural processing device in accordance with an embodiment.
Figure 25B:
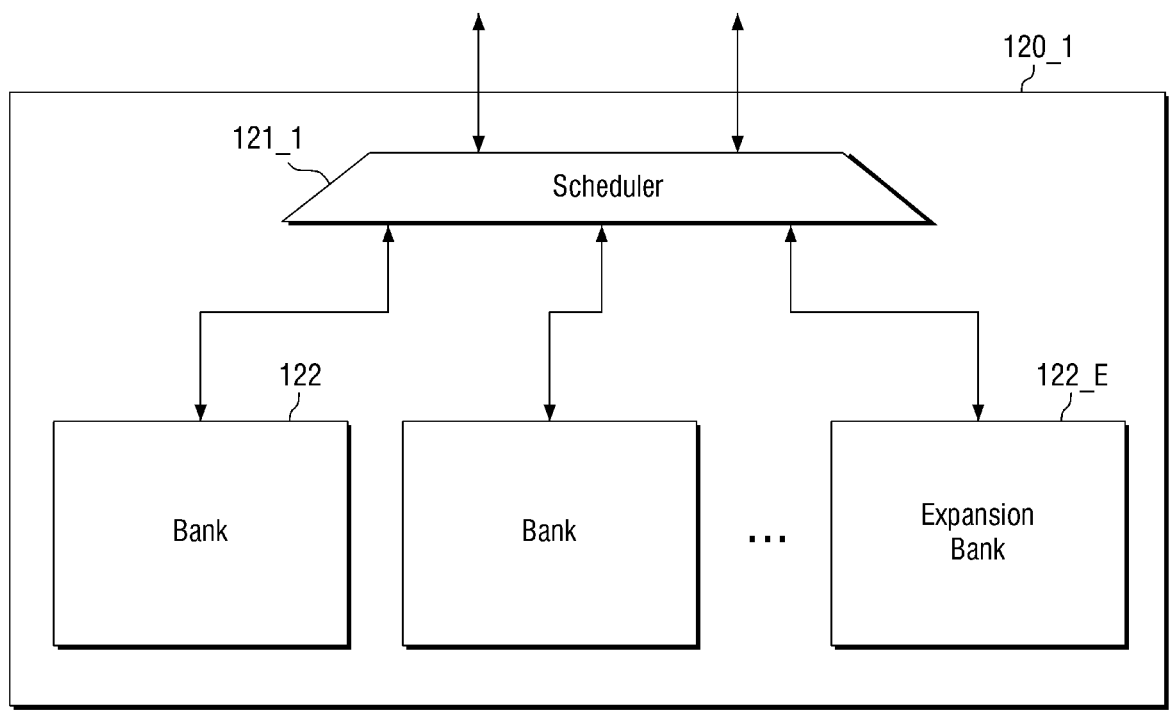
FIG. 25B is a block diagram illustrating an L0 memory in accordance with an embodiment.

FIG. 25A is a block diagram illustrating a neural processing device in accordance with an embodiment, and FIG. 25B is a block diagram for illustrating the L0 memory in accordance with an embodiment.

Referring to FIGS. 7, 25A, and 25B, in the neural processing device 1 in accordance with some embodiments of the disclosure, the LSU 110 may include an extension scheduler 121_1, and the load engine 113*a* and the store engine 113*b* may not use data with different priorities. Instead, an expansion bank 122_E may be included in the L0 memory 120 by further increasing the number of local memory banks 122 included in the L0 memory 120.

That is, when the number of local memory banks 122 increases as the number of inputs increases, there is no need to wait for existing data, and thereby, it is possible to prevent a calculation speed of the neural core 100 from being delayed.

The extension scheduler 121_1 may have a reference input/output ratio. In this case, the reference input/output ratio may indicate the largest ratio of outputs to inputs which prevents an input waiting time. The number of data units fed to the extension scheduler 121_1 divided by the number of memory banks (e.g., sum of the number of the local memory banks 122 and the number of the extension banks 122_E of the L0 memory 120) may be less than the reference input/output ratio.

Therefore, a main load/store operation may not be damaged only by increasing the number of local memory banks 122 in the L0 memory 120 without priority tagging of load data.

Hereinafter, the neural processing device 1 in accordance with some embodiments of the disclosure will be described with reference to FIG. 26. Redundant descriptions thereof will be simplified or be omitted.

Hereinafter, the neural processing device 1 in accordance with an embodiment will be described with reference to FIG. 26.

Figure 26:
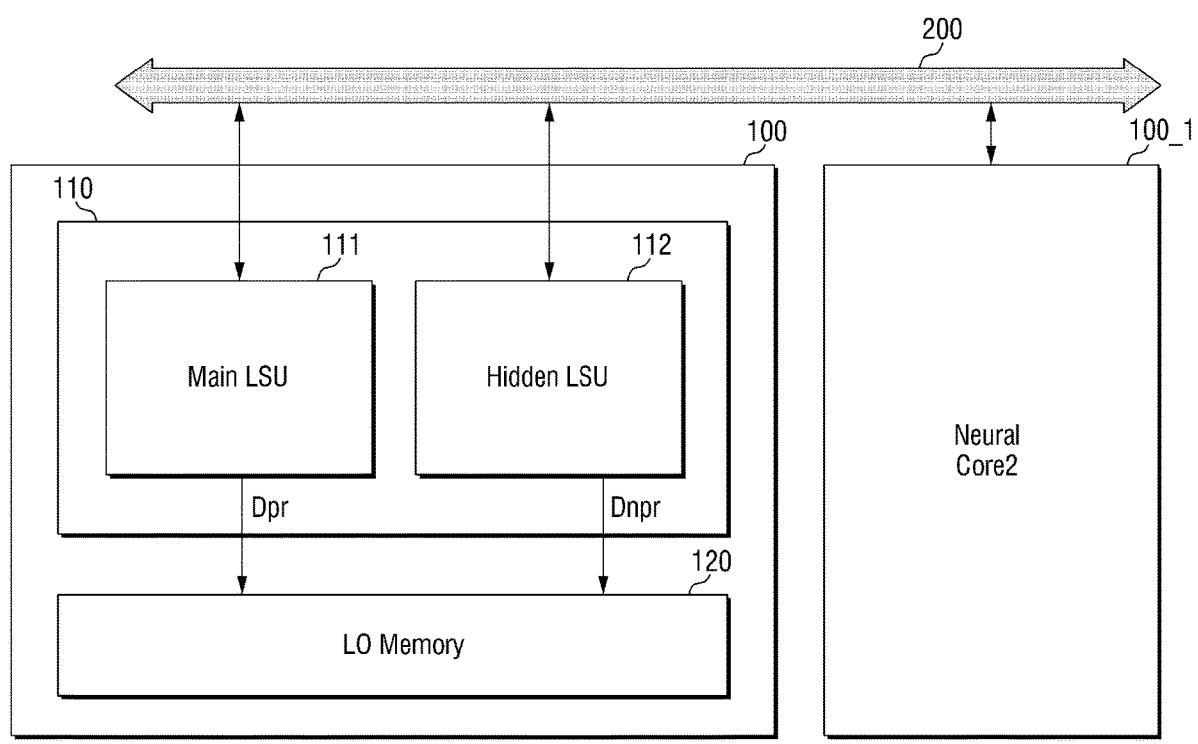
FIG. 26 is a block diagram illustrating a neural processing device in accordance with an embodiment.

FIG. 26 is a block diagram illustrating the neural processing device in accordance with an embodiment.

Referring to FIG. 26, the neural processing device 1 in accordance with some embodiments of the disclosure may include a first neural core 100, a second neural core 100_1, and the local interconnection 200.

The first neural core 100 may be the same as the neural core 100 of FIG. 1. The second neural core 100_1 may be another core separated from the first neural core 100. The first neural core 100 may exchange data with the second neural core 100_1 through the local interconnection 200.

The local interconnection 200 may be a path for transmitting data between the neural cores. The local interconnection 200 may increase a speed of a multi-core system through communication between the neural cores.

The LSU 110 of the first neural core 100 may communicate with the second neural core 100_1 through the local interconnection 200. In particular, the main LSU 111 and the hidden LSU 112 may load and store data through a local bus.

Through this, the embodiment may maximize utilization of a bandwidth in data exchange between neural cores.

Hereinafter, a load/store method of the neural processing device 1 in accordance with some embodiments of the disclosure will be described with reference to FIG. 18 and FIGS. 27 to 29. Redundant descriptions thereof will be simplified or be omitted.

Hereinafter, a load/store method of the neural processing device 1 in accordance with an embodiment will be described with reference to FIG. 27.

Figure 27:
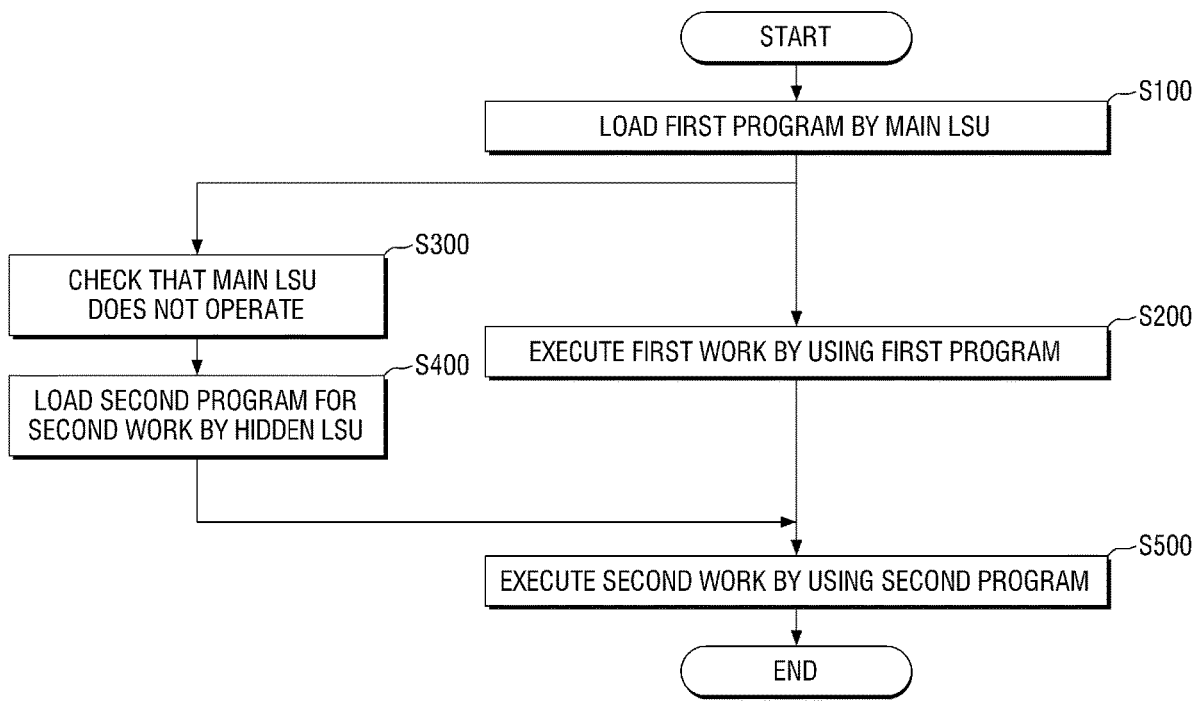
FIG. 27 is a flowchart illustrating a load/store method of a neural processing device, in accordance with an embodiment.

FIG. 27 is a flowchart illustrating a load/store method of the neural processing device in accordance with an embodiment.

Referring to FIG. 27, the main LSU 111 loads a first program at S100. In some embodiments, the main LSU 111 may load at least one program instructions for the first program.

Hereinafter, a process for loading the first program will be described with reference to FIG. 28.

Figure 28:
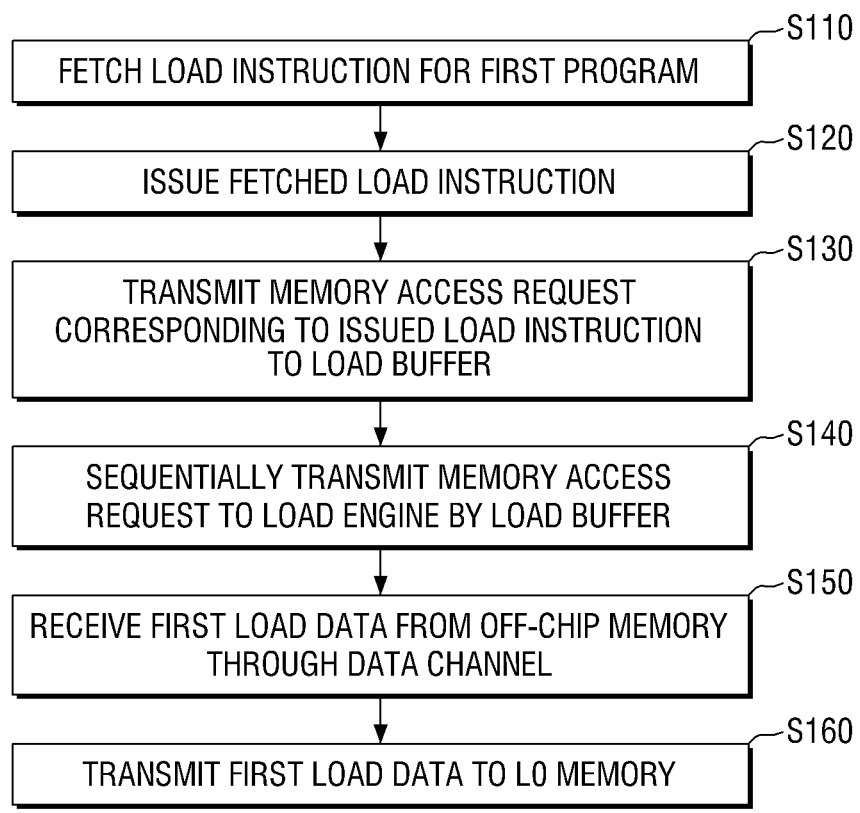
FIG. 28 is a flowchart for illustrating the loading a first program in accordance with an embodiment.

FIG. 28 illustrates a process for loading a first program.

Referring to FIG. 28, the load unit 111*a* may fetch a load instruction for the first program at S110 and may issue the fetched load instruction at S120.

Subsequently, the load unit 111*a* may transmit a memory access request corresponding to the issued load instruction to the load buffer 111*a_b* at S130, and the load buffer 111*a_b* may sequentially transmit the memory access request to the load engine 113*a* at S140.

Next, the load engine 113*a* may receive first load data from an off-chip memory 30 through a data channel at S150 and may transmit the first load data to an L0 memory 120 at S160. In some embodiments, the first load data may correspond to at least one program instructions for the first program.

Referring to FIG. 27 again, the processing unit 160 may execute a first work by using the first program at S200. In some embodiments, the processing unit 160 may execute at least one loaded program instructions for the first program.

Specifically, referring to FIG. 18, the first program is required for the first work execution EXEC1 and may be used for a deep learning operation. Because the first program load PrLD1 has to precede the first work execution EXEC1 (i.e., the first work), the first work execution EXEC1 may depend on the first program load PrLD1.

Referring to FIG. 27 again, after checking that the main LSU 111 does not operate at S300, the hidden LSU 112 may load a second program for a second work at S400. In some embodiments, the hidden LSU 112 may load at least one program instructions for the second program. In some embodiments, the second program may correspond to a program that is performed after the first program is performed.

Hereinafter, a process for loading the second program will be described with reference to FIG. 29.

Figure 29:
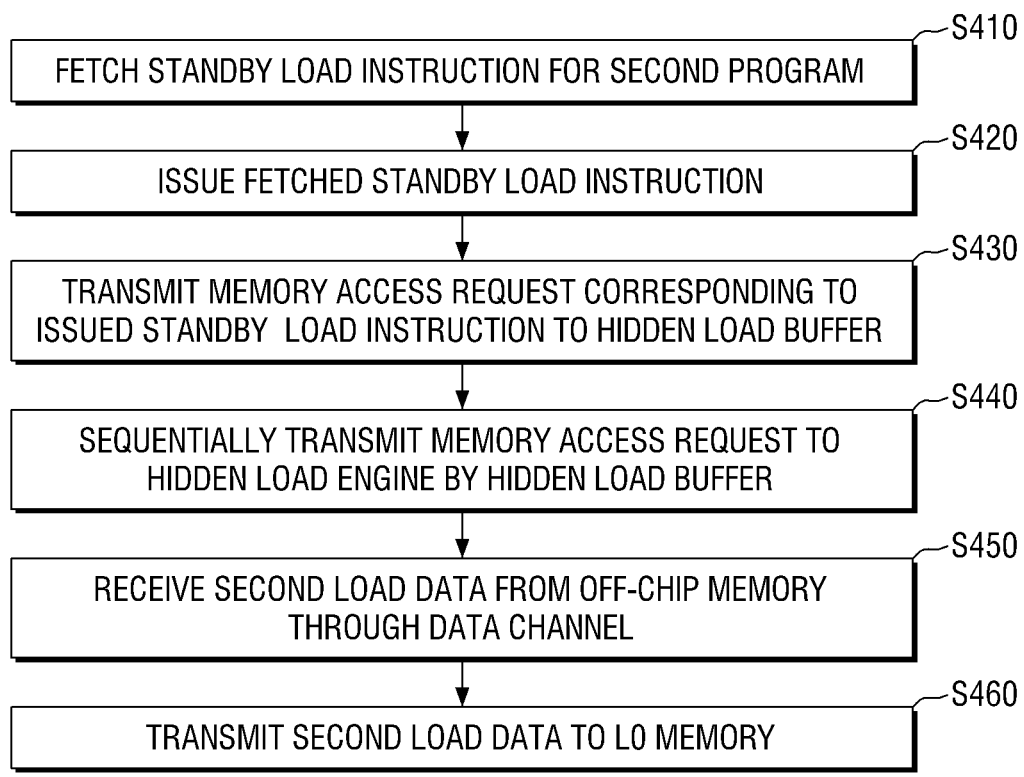
FIG. 29 is a flowchart for illustrating the loading a second program in accordance with an embodiment.

FIG. 29 illustrates a process for loading a second program.

Referring to FIG. 29, the hidden load unit 112*a* may fetch a standby load instruction for the second program at S410 and may issue the fetched standby load instruction at S420.

Subsequently, the hidden load unit 112*a* may transmits a memory access request corresponding to the issued standby load instruction to the hidden load buffer 112*a_b* at S430, and the hidden load buffer 112*a_b* may sequentially transmit the memory access request to the load engine 113*a* at S440.

Next, the load engine 113*a* may receive second load data from the off-chip memory 30 through the data channel at S450 and may transmit the second load data to the L0 memory 120 at S460. In some embodiments, the second load data may correspond to at least one program instructions for the second program.

Specifically, referring to FIG. 18, the neural core 100 according to the embodiment may execute the second program load PrLD2 in parallel with the first work execution EXEC1 of the deep learning operation. Accordingly, the second work execution EXEC2 may start immediately at a point in time when the first work execution EXEC1 is completed. Through this, the neural core 100 according to the embodiment may dramatically increase a speed of the deep learning operation.

Also, referring to FIG. 9, the hidden load unit 112*a* and the hidden load buffer 112*a_b* may detect the time when the load unit 111*a* and the load buffer 111*a_b* do not transmit a memory access request to the load engine 113*a* and may transmit a memory access request to the load engine 113*a*.

The operation S300 and the operation S400 may be performed in parallel with the operation S200.

Referring to FIG. 27 again, the processing unit 160 may execute the second work by using the second program at S500. In some embodiments, the processing unit 160 may execute the at least one loaded program instructions for the second program.

Specifically, referring to FIG. 18, the second program may be required for the second work execution EXEC2 and may be used for a deep learning operation. Because the second program load PrLD2 has to precede the second work execution EXEC2, that is, the second work, the second work execution EXEC2 may depend on the second program load PrLD2.

In the load/store method of the neural processing device 1 according to the embodiment, the first work is executed in parallel with load of the second program for the second work, and thus, efficiency of the operations is increased, and a bandwidth of the global interconnection 6000 that has not been utilized may be used to the maximum.

Hereinafter, the load/store method of the neural processing device 1 in accordance with some embodiments of the disclosure will be described with reference to FIGS. 7, 30, and 31. Redundant descriptions thereof will be simplified or be omitted.

Hereinafter, a load/store method of the neural processing device 1 in accordance with an embodiment will be described with reference to FIG. 30.

Figure 30:
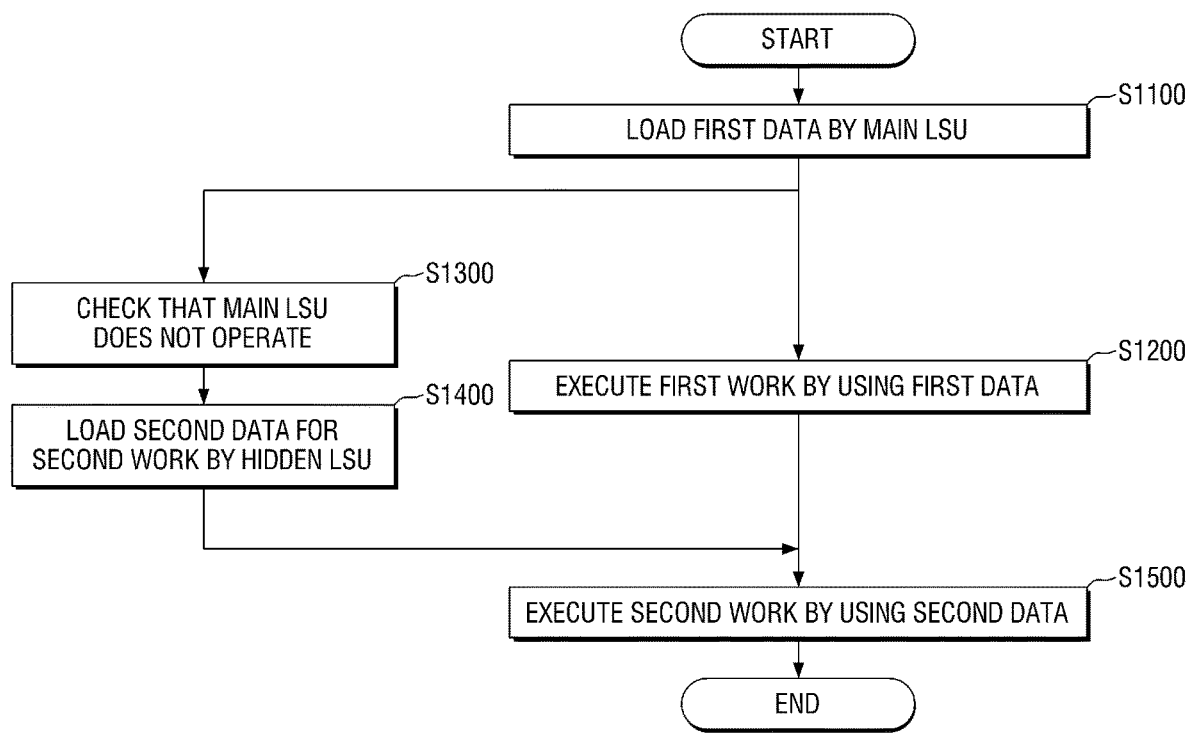
FIG. 30 is a flowchart illustrating a load/store method of a neural processing device, in accordance with an embodiment.

FIG. 30 is a flowchart illustrating the load/store method of the neural processing device in accordance with an embodiment.

Referring to FIG. 30, the main LSU 111 may load first data at S1100. In some embodiments, the main LSU 111 may load data used for the first program as the first data. In some embodiments, the first data may include the input activation Act_In for the first program.

Figure 31:
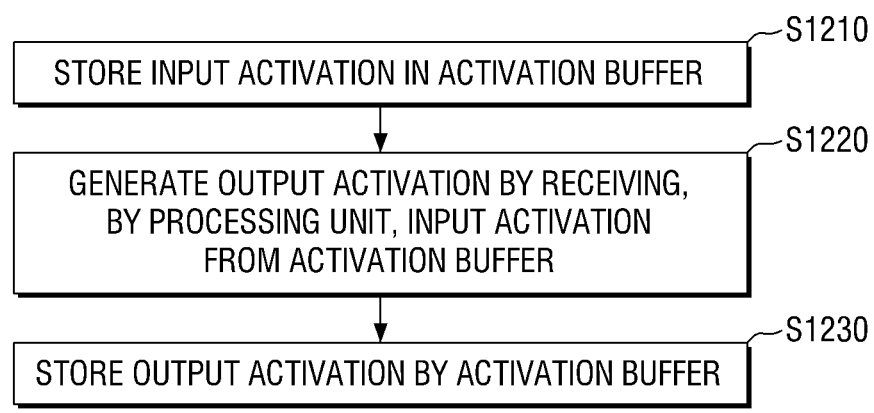
FIG. 31 is a flowchart for illustrating the executing a first work in accordance with an embodiment.

Specifically, referring to FIG. 31, the first fetch Fetch1 may be performed. The first fetch Fetch1 may be fetching data for deep learning and inference.

Referring to FIG. 30 again, the processing unit 160 may execute a first work by using the first data at S1200.

Hereinafter, a process for executing the first work in accordance with an embodiment will be described with reference to FIG. 31.

FIG. 31 is a flowchart for illustrating a process for executing a first work in accordance with an embodiment.

Referring to FIG. 31, the activation LSU 140 may store an input activation in an activation buffer 150 at S1210.

In some embodiments, the activation LSU 140 may transmit the input activation Act_In from the L0 memory 120 to the activation buffer 150. The activation buffer 150 may temporarily store the input activation Act_In.

The processing unit 160 may receive an input activation from the activation buffer 150 to generate an output activation at S1220. Then, the activation buffer 150 may store the output activation at S1230.

Referring to FIG. 30 again, after checking that the main LSU 111 does not operate at S1300, the hidden LSU 112 may load second data for a second work at S1400. In some embodiments, the hidden LSU 112 may load data used for the second program as the second data. In some embodiments, the second data may include the input activation Act_In for the second program.

The operation S1300 and the operation S1400 may be performed in parallel with the operation S1200.

Referring to FIG. 30 again, the processing unit 160 may execute a second work by using the second data at S1500.

Specifically, referring to FIG. 19, the second work execution EXEC2 may also be dependent because data has to be loaded like the second prefetch EXEC2. The neural processing device 1 according to the embodiment may perform the second prefetch PreFetch2 that fetches data corresponding to the second work execution EXEC2 in advance during the first work execution EXEC1, and thereby, as soon as the first work execution EXEC1 is completed, the second work execution EXEC2 may start immediately.

While the disclosure has been particularly shown and described with reference to exemplary embodiments thereof, it will be understood by those of ordinary skill in the art that various changes in form and details may be made therein without departing from the spirit and scope of the disclosure as defined by the following claims. It is therefore desired that the embodiments be considered in all respects as illustrative and not restrictive, reference being made to the appended claims rather than the foregoing description to indicate the scope of the disclosure.

Various aspects of the disclosure are described below as examples for convenience, but do not limit the technology.

According to some aspects of the disclosure, a neural processing device includes: a processing unit configured to receive an input activation and a weight and generate an output activation by a two-dimensional matrix calculation, and an LSU configured to transmit a program received through a global interconnection and input data to an L0 memory, and to perform a load/store operation for transmitting output data from the L0 memory to the global interconnection, wherein the load/store operation includes a main load/store operation for a current operation that is performed by the processing unit, and a standby load/store operation for a standby operation that is performed by the processing unit after the current operation.

According to some aspects, the neural processing device further includes: an activation buffer configured to provide the input activation to the processing unit, receive the output activation from the processing unit, and temporarily store the input activation and the output activation, the L0 memory configured to temporarily store the program used for the calculation which is performed by the processing unit and the input data including the input activation and the weight, transmit the stored program and the input data to the processing unit and temporarily store the output data received from the processing unit, and an activation LSU configured to transmit the input activation from the L0 memory to the activation buffer and transmit the output activation from the activation buffer to the L0 memory.

According to some aspects, the standby load/store operation is performed by using a bandwidth that is not used by the main load/store operation among bandwidths of the global interconnection.

According to some aspects, the LSU includes: a main LSU configured to perform the main load/store operation and transmit first load data and first store data to the L0 memory, and a hidden LSU configured to perform the standby load/store operation and transmit second load data and second store data to the L0 memory.

According to some aspects, the hidden LSU includes: a hidden load unit configured to fetch a standby load instruction received from a task controller to issue the standby load instruction, a hidden store unit configured to fetch a standby store instruction received from the task controller to issue the standby store instruction, a hidden load buffer configured to sequentially receive a memory access request corresponding to the standby load instruction from the hidden load unit, a hidden store buffer configured to sequentially receive a memory access request corresponding to the standby store instruction from the hidden store unit, a hidden load engine configured to receive the memory access request from the hidden load buffer and transmit the second load data to the L0 memory, and a hidden store engine configured to receive the memory access request from the hidden store buffer and transmit the second store data to the L0 memory.

According to some aspects, the LSU further includes a translation lookaside buffer configured to store a translation table of recently used virtual memory addresses and physical memory addresses.

According to some aspects, the main LSU includes: a load unit configured to fetch a load instruction and to issue the load instruction, a store unit configured to fetch a store instruction and to issue the store instruction, a load buffer configured to sequentially receive a memory access request from the load unit, a store buffer configured to sequentially receive a memory access request from the store unit, a load engine configured to receive the memory access request from the load buffer and transmit the first load data to the L0 memory, and a store engine configured to receive the memory access request from the store buffer and transmit the first store data to the L0 memory.

According to some aspects, the first load data has a higher priority than the second load data, and the first store data has a higher priority than the second store data.

According to some aspects, the priority is tagged to the first load data, the second load data, the first store data, and the second store data.

According to some aspects, the priority is tagged by the load engine or the store engine.

According to some aspects, the LSU further includes a scheduler configured to receive the first load data, the second load data, the first store data, and the second store data and transmit the first load data, the second load data, the first store data, and the second store data to the L0 memory in a round-robin manner.

According to some aspects, the L0 memory includes a plurality of local memory banks, a value obtained by dividing the number of inputs of the first load data, the second load data, the first store data, and the second store data per unit clock cycle by the number of local memory banks of the L0 memory is less than a reference input/output ratio of the scheduler, and the reference input/output ratio is a largest input/output ratio value in a range in which waiting time of each of the first load data, the second load data, the first store data, and the second store data does not occur by the scheduler.

According to some aspects, the hidden LSU and the main LSU share at least a part of hardware with each other.

According to some aspects, the hidden LSU and the main LSU are implemented by different hardware.

According to some aspects, the processing unit includes: a PE array configured to perform a two-dimensional matrix calculation for sequentially multiplying the input activation and the weight, and to generate the output activation, and a vector unit configured to perform a one-dimensional calculation.

According to some aspects, the global interconnection includes any one of a data channel, a control channel, and an L2 sync channel.

According to some aspects of the disclosure, a neural processing device that includes a shared memory for storing a program for a calculation and input data and a global interconnection for transmitting the input data and a control signal from the shared memory, receives the program, the input data, and the control signal to perform a two-dimensional matrix calculation, and generates output data, includes: an LSU configured to load the program and the input data from the shared memory and store the output data in the shared memory, a processing unit configured to perform a calculation by using the program and the input data, and an L0 memory configured to temporarily store the program, the input data, and the output data between the processing unit and the LSU, wherein the global interconnection includes a control channel for transmitting the control signal and a data channel for transmitting the input data and the output data, the LSU performs a main load/store operation for a current operation currently performed by the processing unit, and a standby load/store operation for a standby operation performed by the processing unit after the current operation, and the standby load/store operation is performed by using a bandwidth that is not used by the main load/store operation among bandwidths of the data channel.

According to some aspects, the shared memory is formed in the same chip as the neural processing device.

According to some aspects, the neural processing device, further includes: a first neural processing device, a second neural processing device different from the first neural processing device, and a local interconnection for transmitting the input data and the output data between the first neural processing device and the second neural processing device, wherein the LSU performs the standby load/store operation by using a bandwidth that is not used by the main load/store operation among bandwidths of the local interconnection.

According to some aspects, the LSU includes a main LSU configured to perform the main load/store operation, and a hidden LSU configured to perform the standby load/store operation, and the standby load/store operation has a lower priority than the main load/store operation.

According to some aspects, the priority is identified in a tagged form.

According to some aspects, the neural processing device, further includes: an activation buffer configured to provide an input activation to the processing unit and receive an output activation from the processing unit, and an activation LSU configured to fetch the input activation from the L0 memory, transmit the input activation to the activation buffer, and transmit the output activation from the activation buffer to the L0 memory.

According to some aspects of the disclosure, a load/store method of a neural processing device, includes: loading a first program for a first work by a main LSU, executing the first work by using the first program, loading, by a hidden LSU, a second program for a second work to be executed after the first work, when the main LSU does not operate during the first work, and executing the second work by using the second program when the first work and the loading of the second program are completed.

According to some aspects, the loading of the second program includes: fetching a standby load instruction for the second program, issuing the fetched standby load instruction, transmitting a memory access request corresponding to the issued standby load instruction to a hidden load buffer, sequentially transmitting, by the hidden load buffer, the memory access request to a load engine, receiving, by the load engine, second load data from an off-chip memory through a data channel according to the memory access request, and transmitting the second load data to an L0 memory.

According to some aspects, the loading of the first program includes: fetching a load instruction for the first program, issuing the fetched load instruction, transmitting a memory access request corresponding to the issued load instruction to a load buffer, sequentially transmitting, by the load buffer, the memory access request to the load engine, receiving, by the load engine, first load data from the off-chip memory through the data channel according to the memory access request, and transmitting the first load data to the L0 memory.

According to some aspects, the first load data has a higher priority than the second load data.

According to some aspects of the disclosure, a load/store method of a neural processing device, includes: performing, by a main LSU, a load operation of first data for a first work, executing the first work by using the first data, performing, by a hidden LSU, a load operation of second data for a second work to be executed after the first work, when checking that the main LSU does not operate during the first work, and executing the second work by using the second data when the first work and the load operation of the second data are completed.

According to some aspects, the first work is a matrix calculation operation of a first layer of a neural network, the second work is a matrix calculation operation of a second layer of the neural network, and the second data is kernel data of the second layer.

According to some aspects, the first data includes an input activation, and the executing of the first work includes: storing the input activation in an activation buffer, generating an output activation by receiving, the input activation by a processing unit from the activation buffer, and storing the output activation in the activation buffer.

What is claimed is:
1. A neural processing device comprising:
a processing unit configured to receive an input activation and a weight and perform a two-dimensional matrix calculation with the input activation and the weight to generate an output activation;
a first memory; and
a load-store unit (LSU) configured to perform memory access operations between the first memory and a second memory,
wherein the memory access operations include a main memory access operation for a current processing operation that is performed by the processing unit, and a standby memory access operation for a standby processing operation that is performed by the processing unit after the current processing operation,
wherein a level of the first memory is equal to a level of the processing unit, and a level of the second memory is different from the level of the first memory, and
wherein the LSU comprises:
a main LSU configured to perform the main memory access operation between the first memory and the second memory; and
a hidden LSU configured to perform the standby memory access operation between the first memory and the second memory.

2. The neural processing device of claim 1, further comprising:
an activation buffer configured to provide the input activation to the processing unit, receive the output activation from the processing unit, and temporarily store the input activation and the output activation; and
an activation LSU configured to transmit the input activation from the first memory to the activation buffer and transmit the output activation from the activation buffer to the first memory,
wherein the first memory is configured to temporarily store program, the input activation and the weight used for calculation which is performed by the processing unit, transmit the stored program, input activation and weight to the processing unit, and temporarily store the output data received from the processing unit.

3. The neural processing device of claim 1, wherein the standby memory access operation is performed by using a bandwidth that is not used by the main memory access operation within a bandwidth of a global interconnection.

4. The neural processing device of claim 1, wherein the hidden LSU comprises:
a hidden load unit configured to fetch a standby load instruction received from a task controller to issue the standby load instruction;
a hidden store unit configured to fetch a standby store instruction received from the task controller to issue the standby store instruction;
a hidden load buffer configured to sequentially receive a memory access request corresponding to the standby load instruction from the hidden load unit;
a hidden store buffer configured to sequentially receive a memory access request corresponding to the standby store instruction from the hidden store unit;
a hidden load engine configured to receive the memory access request corresponding to the standby load instruction from the hidden load buffer and load data from the second memory to the first memory; and
a hidden store engine configured to receive the memory access request corresponding to the standby store instruction from the hidden store buffer and store data from the first memory to the second memory.

5. The neural processing device of claim 1, wherein the main LSU comprises:
a load unit configured to fetch a main load instruction and to issue the main load instruction;
a store unit configured to fetch a main store instruction and to issue the main store instruction;
a load buffer configured to sequentially receive a memory access request corresponding to the main load instruction from the load unit;
a store buffer configured to sequentially receive a memory access request corresponding to the main store instruction from the store unit;
a load engine configured to receive the memory access request corresponding to the main load instruction from the load buffer and load data from the second memory to the first memory; and
a store engine configured to receive the memory access request corresponding to the main store instruction from the store buffer and store data from the first memory to the second memory.

6. The neural processing device of claim 1, wherein data transmitted by the main LSU has a higher priority than data transmitted by the hidden LSU.

7. The neural processing device of claim 6, wherein the priority is tagged to data between the first memory and the second memory.

8. The neural processing device of claim 1, wherein the LSU further comprises a scheduler configured to transmit data between the first memory and the second memory in a round-robin manner.

9. The neural processing device of claim 8, wherein
the first memory includes a plurality of local memory banks,
the number of data units between the first memory and the second memory per unit clock cycle divided by the number of the plurality of the local memory banks is less than a reference ratio of the scheduler.

10. The neural processing device of claim 1, wherein the hidden LSU and the main LSU share at least a part of hardware with each other.

11. The neural processing device of claim 1, wherein the hidden LSU and the main LSU are implemented by different hardware.

12. A neural processing device comprising:
a plurality of neural cores;
a second memory configured to be shared between the plurality of neural cores; and
a local interconnection configured to transmit data between the second memory and the plurality of neural cores,
wherein each of the plurality of neural cores comprises:
a first memory configured to temporarily store data;
a load-store unit (LSU) configured to load data from the second memory to the first memory and store data from the first memory in the second memory; and
a processing unit configured to perform a two-dimensional matrix calculation,
wherein the global interconnection includes a control channel for transmitting the control signal and a data channel for transmitting the input data and the output data,
the LSU performs a main memory access operation for a current processing operation currently performed by the processing unit, and a standby memory access operation for a standby processing operation to be performed by the processing unit after the current operation, and
the standby memory access operation is performed by using a bandwidth that is not used by the main memory access operation within a bandwidth of the data channel, and
wherein the LSU comprises:
a main LSU configured to perform the main memory access operation between the first memory and the second memory; and
a hidden LSU configured to perform the standby memory access operation between the first memory and the second memory.

13. The neural processing device of claim 12, further comprising:
  a local interconnection configured to transmit data between the plurality of neural cores,
  wherein the LSU performs the standby memory access operation by using a bandwidth that is not used by the main memory access operation within a bandwidth of the local interconnection.

14. The neural processing device of claim 12, wherein the standby memory access operation has a lower priority than the main memory access operation.

15. A memory access method of a neural processing device including a load-store unit (LSU) and a processing unit, comprising:
  loading, by the LSU, first data for a first work from a second memory to a first memory;
  executing the first work by using the first data;
  loading, by the LSU, a second data for a second work to be executed after the first work, when data for the first work is not loaded; and
  executing the second work by using the second data after executing the first work and loading the second data are completed,
  wherein a level of the first memory is equal to a level of the processing unit, and a level of the second memory is different from the level of the first memory, and
  wherein the LSU comprises:
  a main LSU configured to load the first data from the second memory to the first memory; and
  a hidden LSU configured to load the second data from the second memory to the first memory.

16. The memory access method of claim 15, wherein loading of the second data comprises:
  fetching a standby load instruction for the second data;
  issuing the fetched standby load instruction;
  transmitting a memory access request corresponding to the issued standby load instruction to a hidden load buffer;
  transmitting, by the hidden load buffer, the memory access request to a load engine;
  receiving, by the load engine, the second data from the second memory through a data channel according to the memory access request; and
  transmitting the second data to the first memory.

17. The memory access method of claim 16, wherein the loading of the first data comprises:
  fetching a load instruction for the first data;
  issuing the fetched load instruction;
  transmitting a memory access request corresponding to the issued load instruction to a load buffer;
  transmitting, by the load buffer, the memory access request to the load engine;
  receiving, by the load engine, the first data from the second memory through the data channel according to the memory access request; and
  transmitting the first data to the first memory.

18. The memory access method of claim 15, wherein the first work is a matrix calculation operation of a first layer of a neural network,
  the second work is a matrix calculation operation of a second layer of the neural network.

19. The memory access method of claim 15, wherein the first data is a program instruction for the first layer and the second data is a program instruction for the second layer.

20. The memory access method of claim 15, wherein the first data is input activation for the first layer and the second data is kernel data of the second layer.

* * * * *